United States Patent
Isozaki et al.

(10) Patent No.: US 10,229,547 B2
(45) Date of Patent: Mar. 12, 2019

(54) IN-VEHICLE GATEWAY DEVICE, STORAGE CONTROL METHOD, AND COMPUTER PROGRAM PRODUCT

(71) Applicant: Kabushiki Kaisha Toshiba, Minato-ku (JP)

(72) Inventors: Hiroshi Isozaki, Kawasaki (JP); Taku Kato, Kamakura (JP); Jun Kanai, Inagi (JP); Naoko Yamada, Yokohama (JP); Kentaro Umesawa, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/436,031

(22) Filed: Feb. 17, 2017

(65) Prior Publication Data
US 2017/0278320 A1    Sep. 28, 2017

(30) Foreign Application Priority Data
Mar. 23, 2016    (JP) .................................. 2016-058798

(51) Int. Cl.
*G07C 5/08*    (2006.01)
*G07C 5/00*    (2006.01)
(Continued)

(52) U.S. Cl.
CPC .......... *G07C 5/0808* (2013.01); *G06F 13/387* (2013.01); *G06F 13/4027* (2013.01);
(Continued)

(58) Field of Classification Search
CPC ...... G07C 5/0808; G07C 5/008; G07C 5/085; H04L 12/66; H04L 67/12
(Continued)

(56) References Cited

U.S. PATENT DOCUMENTS

| 6,134,660 A | 10/2000 | Boneh et al. |
| 2002/0116103 A1 | 8/2002 | Matsunaga et al. |

(Continued)

FOREIGN PATENT DOCUMENTS

| EP | 2 892 202 A1 | 7/2015 |
| JP | 2002-243591 A | 8/2002 |

(Continued)

OTHER PUBLICATIONS

Dennis K Nilsson et al. "A Defense-in-Depth Approach to Securing the Wireless Vehicle Infrastructure," Journal of Networks, vol. 4, No. 7, Sep. 2009, pp. 13.

(Continued)

*Primary Examiner* — Marthe Y Marc-Coleman
(74) *Attorney, Agent, or Firm* — Oblon, McClelland, Maier & Neustadt, L.L.P.

(57) ABSTRACT

An in-vehicle gateway device according to an embodiment includes a storage unit, a plurality of internal communication processors, a routing processor and a storage controller. The storage unit stores therein data output by an electronic control unit included in the in-vehicle system. The internal communication processors include an internal communication processor to which at least one electronic control unit is connected. The routing processor transfers data among the internal communication processors and outputs at least a part of the transferred data to the storage unit in a form capable of being stored in the storage unit. The storage controller manipulates or filters, in accordance with a certain rule, at least one of the data to store in the storage unit and the data output from the storage unit.

19 Claims, 20 Drawing Sheets

(51) Int. Cl.
*H04L 12/66* (2006.01)
*H04L 29/08* (2006.01)
*G06F 13/38* (2006.01)
*G06F 13/40* (2006.01)
*H04L 9/32* (2006.01)

(52) U.S. Cl.
CPC ............. *G07C 5/008* (2013.01); *G07C 5/085* (2013.01); *H04L 9/32* (2013.01); *H04L 12/66* (2013.01); *H04L 67/12* (2013.01)

(58) Field of Classification Search
USPC ........................................... 701/32.6
See application file for complete search history.

(56) References Cited

U.S. PATENT DOCUMENTS

| | | | | |
|---|---|---|---|---|
| 2008/0243979 | A1* | 10/2008 | Cherkauer | ............ G06F 3/0608 708/303 |
| 2010/0098095 | A1 | 4/2010 | Kato et al. | |
| 2012/0185125 | A1* | 7/2012 | Kitagawa | ............... G07C 5/085 701/32.7 |
| 2012/0204166 | A1* | 8/2012 | Ichihara | ........... G08G 1/096716 717/168 |
| 2014/0036693 | A1 | 2/2014 | Mabuchi | |
| 2014/0297109 | A1* | 10/2014 | Shimomura | .......... H04L 67/125 701/36 |
| 2015/0135038 | A1* | 5/2015 | Wilson | ................... G11C 29/76 714/773 |
| 2015/0180840 | A1 | 6/2015 | Jung et al. | |
| 2015/0372975 | A1 | 12/2015 | Moriya et al. | |
| 2016/0035148 | A1 | 2/2016 | Huang et al. | |
| 2017/0297570 | A1* | 10/2017 | Yamakoshi | ........... B60W 30/09 |

FOREIGN PATENT DOCUMENTS

| | | |
|---|---|---|
| JP | 2004-260484 A | 9/2004 |
| JP | 2007-028376 A | 2/2007 |
| JP | 2010-038619 A | 2/2010 |
| JP | 2011-000894 A | 1/2011 |
| JP | 2011-121425 | 6/2011 |
| JP | 2014-027517 A | 2/2014 |
| JP | 2014-165641 A | 9/2014 |
| JP | 2015-115023 A | 6/2015 |

OTHER PUBLICATIONS

Office Action dated Dec. 7, 2018 issued in corresponding Japanese Patent Application No. 2016-058798 with English Translation.

* cited by examiner

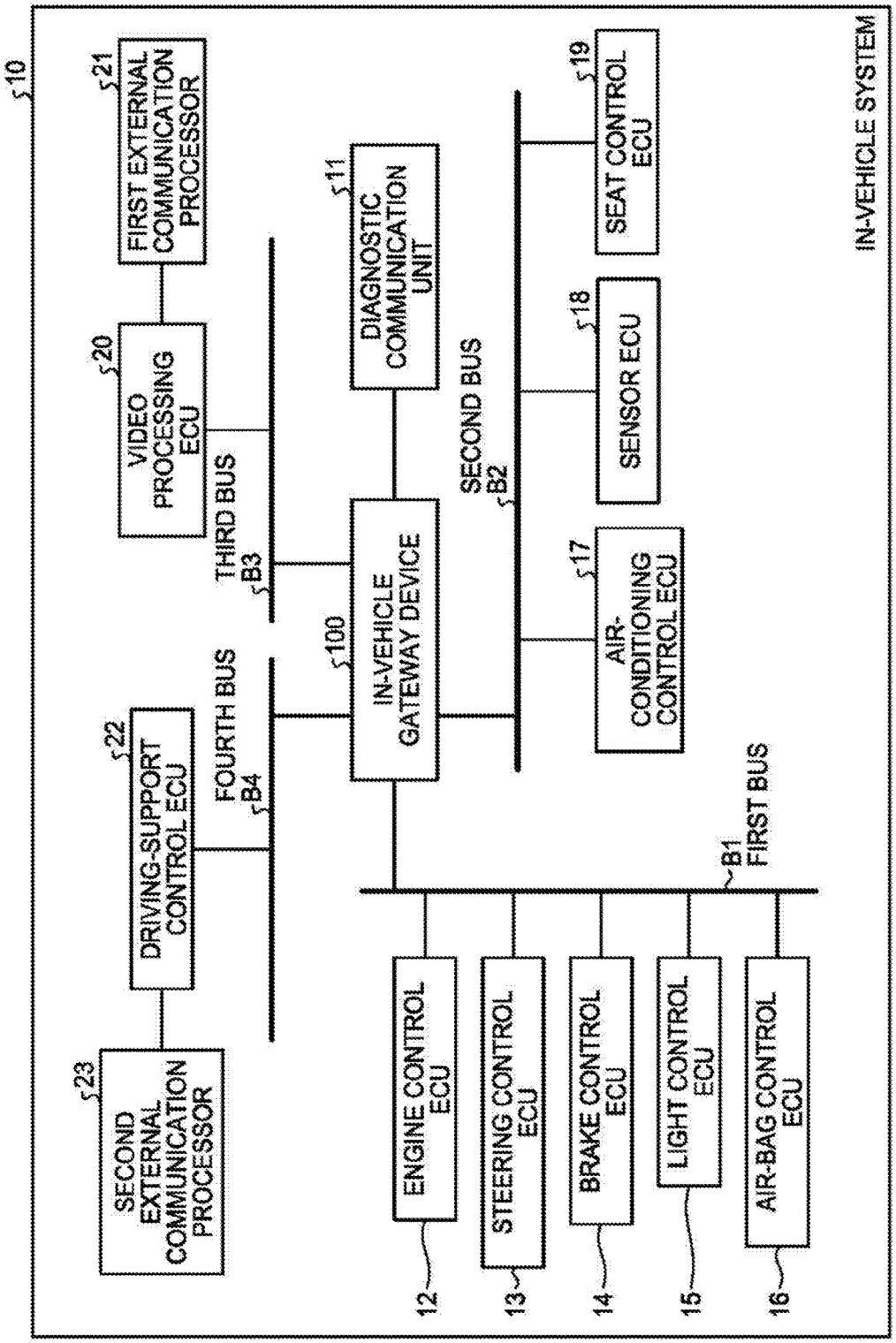

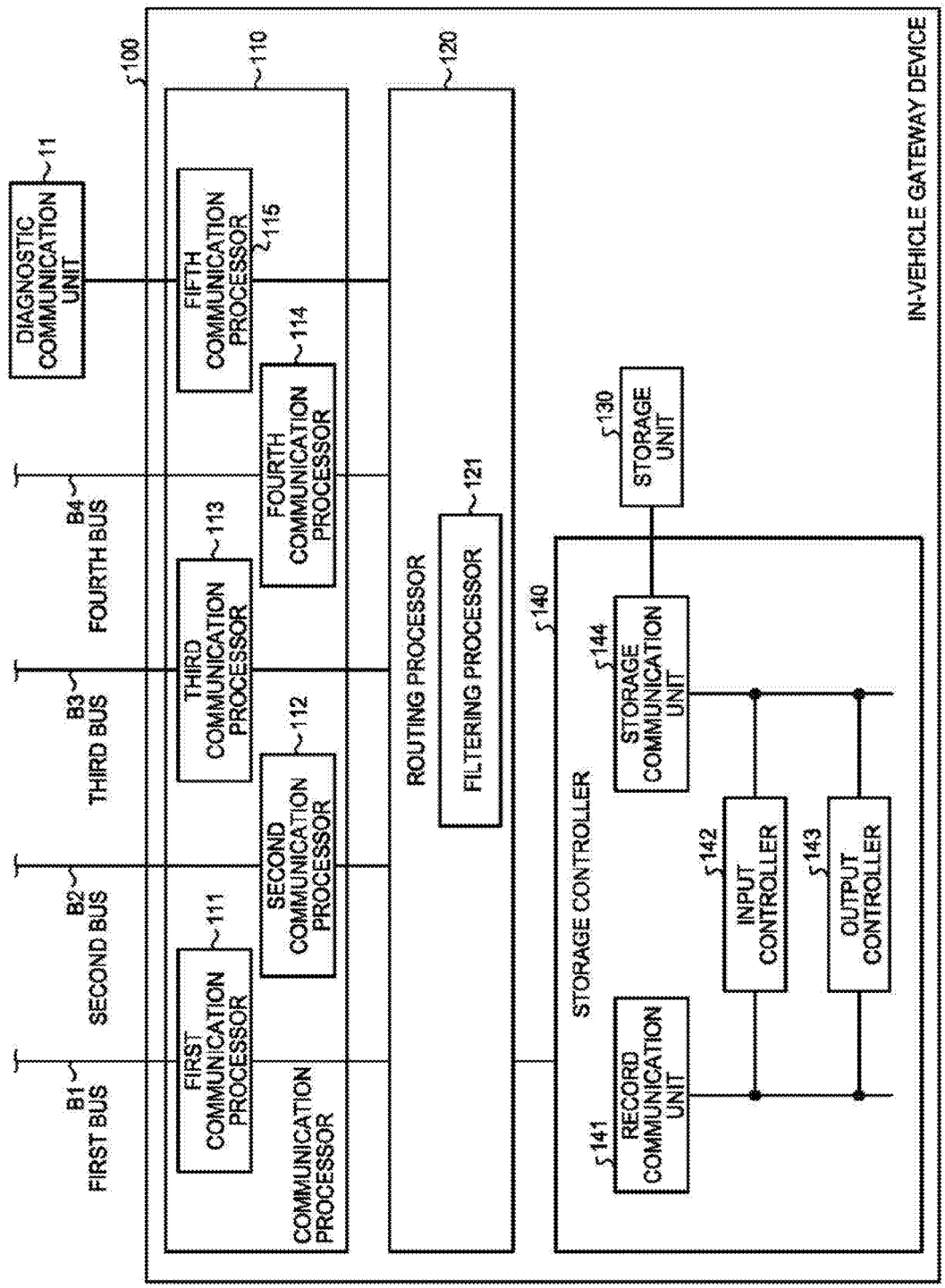

IN-VEHICLE GATEWAY DEVICE, STORAGE CONTROL METHOD, AND COMPUTER PROGRAM PRODUCT

CROSS-REFERENCE TO RELATED APPLICATIONS

This application is based upon and claims the benefit of priority from Japanese Patent Application No. 2016-058798, filed on Mar. 23, 2016; the entire contents of which are incorporated herein by reference.

FIELD

Embodiments described herein relate generally to an in-vehicle gateway device, a storage control method, and a computer program product.

BACKGROUND

Conventionally, there have been recording devices to record data in in-vehicle systems. Those recording devices include a function of recording video data that is filmed by a camera into a recording medium such as a hard disk drive (HDD) and an SD card as typified by a drive recorder.

Furthermore, developed has been a system that collects data output from an electronic control unit (ECU) installed in an in-vehicle system, and records the data to a server outside the vehicle as a log.

In the conventional technologies, however, it is not assumed that the in-vehicle system is connected to an external device via a network and is attacked from a malicious external device, and that a malicious device and a computer program are being present inside the in-vehicle system. Thus, the threats in which, by an attacker or a malicious user, the data that is recorded in the recording medium is illegitimately acquired, illegitimately altered, and illegitimately erased have not been dealt with.

Moreover, developed has been a scheme that detects an abnormality that has occurred inside an in-vehicle system, and a failure in verification processing on security, and records them into a log. Even in this case, however, it is not assumed that the data recorded in the recording medium is illegitimately manipulated by an illegitimate module or an illegitimate program inside the in-vehicle system. Thus, even when a security incident has occurred, a specific implementation method to leave the traces thereof has not been disclosed.

Furthermore, the data that the ECU outputs contains know-how of an original equipment manufacturer (OEM), and thus the data can be a subject of protection for the OEM. For example, desired is a scheme in which all the data that the ECU output and stored in the in-vehicle system are disclosed to the OEM itself or to a third party that the OEM permitted such as an insurance company and a legal institution such as a court, while preventing the acquisition and analysis of the data for general users and for competitors of the OEMs, or partially disclosing the stored data publicly. However, its specific implementation method has not been disclosed. From the foregoing situations, when data that the ECU outputs is stored inside the in-vehicle system, structuring a scheme that is capable of limiting the output of the data depending on its purpose while protecting the data to store is desired.

BRIEF DESCRIPTION OF THE DRAWINGS

FIG. 1 is a block diagram illustrating a schematic configuration of an in-vehicle system;

FIG. 2 is a block diagram illustrating an example of a functional configuration of an in-vehicle gateway device according to a first embodiment;

DETAILED DESCRIPTION

Figure 3A:
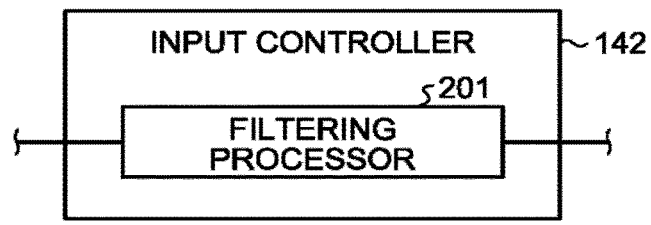
FIG. 3A is a block diagram illustrating an example of the internal configuration of an input controller.

An in-vehicle gateway device according to an embodiment includes a storage unit, a plurality of internal communication processors, a routing processor and a storage controller. The storage unit stores therein data output by an electronic control unit included in the in-vehicle system. The internal communication processors include an internal communication processor to which at least one electronic control unit is connected. The routing processor transfers data among the internal communication processors and outputs at least a part of the transferred data to the storage unit in a form capable of being stored in the storage unit. The storage controller manipulates or filters, in accordance with a certain rule, at least one of the data to store in the storage unit and the data output from the storage unit.

An in-vehicle gateway device in exemplary embodiments selectively outputs the stored data after the occurrence of a security accident and the like, while efficiently storing data an ECU outputs and preventing the data from being altered. The following describes specific examples of the configuration of such an in-vehicle gateway device in detail with reference to the accompanying drawings.

First Embodiment

First, the following describes an in-vehicle system equipped with an in-vehicle gateway device according to a first embodiment. FIG. 1 is a block diagram illustrating a schematic configuration of an in-vehicle system 10. This in-vehicle system 10 is assumed to be equipped in a vehicle such as an automobile, a bus, a truck, and a motorcycle. The configuration of the in-vehicle system 10 illustrated in FIG. 1 is one example, and is not limited thereto. For example, the number of ECUs included in the in-vehicle system 10, the assigned roles of the respective ECUs, and the connection relation with an in-vehicle gateway device 100 can be changed as desired depending on the configuration of the vehicle and others. It may be in a redundant configuration in which, in order to improve reliability, particular ECUs are connected to a plurality of buses so that, even when one of the buses fails, the data can be transmitted and received on the other bus.

The in-vehicle system 10 illustrated in FIG. 1 includes the in-vehicle gateway device 100, a diagnostic communication unit 11, an engine control ECU 12, a steering control ECU 13, a brake control ECU 14, a light control ECU 15, an air-bag control ECU 16, an air-conditioning control ECU 17, a sensor ECU 18, a seat control ECU 19, a video processing ECU 20, a first external communication processor 21, a driving-support control ECU 22, and a second external communication processor 23.

The engine control ECU 12 is an ECU that controls an engine of the vehicle. The steering control ECU 13 is an ECU that controls the steering operation of the vehicle. The brake control ECU 14 is an ECU that controls brakes of the vehicle. The light control ECU 15 is an ECU that controls the operation of lights (electric lamps) of the vehicle. The air-bag control ECU 16 is an ECU that controls the operation of air-bags of the vehicle.

The foregoing engine control ECU 12, the steering control ECU 13, the brake control ECU 14, the light control ECU 15, and the air-bag control ECU 16 are connected to a first bus B1 that conforms to the standard of Controller Area Network (CAN), and constitute a network referred to as a power train CAN, for example. Each ECU in the power train CAN is connected to the in-vehicle gateway device 100 via the first bus B1.

The air-conditioning control ECU 17 is an ECU that controls air-conditioning of the vehicle. The sensor ECU 18 is an ECU that includes various sensors that measure the state of the vehicle on the inside and outside, such as a temperature sensor and a pressure sensor of the vehicle. The seat control ECU 19 is an ECU that controls the seat position of the vehicle.

The foregoing air-conditioning control ECU 17, the sensor ECU 18, and the seat control ECU 19 are connected to a second bus B2 that conforms to the standard of CAN, and constitute a network referred to as a body CAN, for example. Each ECU in the body CAN is connected to the in-vehicle gateway device 100 via the second bus B2. As one example of the above-described redundant configuration, the sensor ECU 18 may include a plurality of ECUs each of which is connected to a bus different from one another, and these ECUs may acquire an identical sensor signal and output it to different buses.

The video processing ECU 20 is an ECU that performs the processing of displaying map information and a state of the vehicle on a display device such as a liquid-crystal display monitor, for example. The video processing ECU 20 is connected to the first external communication processor 21 in order to acquire map information, traffic congestion information, and others from the outside. The first external communication processor 21 performs the processing of communicating with a mobile communication network such as the 3rd Generation Partnership Project (3GPP, registered trademark) and Long Term Evolution (LTE, registered trademark), and with the Internet by using wireless communication such as Wi-Fi (registered trademark) and Bluetooth (registered trademark), for example.

The video processing ECU 20 and the first external communication processor 21 are connected to a third bus B3 that conforms to the standard such as IBD-1394 and Media Oriented Systems Transport (MOST, registered trademark), and constitute a network referred to as an Audio-Visual (AV) network, for example. The video processing ECU 20 and the first external communication processor 21 are connected to the in-vehicle gateway device 100 via the third bus B3.

The driving-support control ECU 22 is an ECU that performs such processing as a route selection control necessary for Advanced Driving Assistant System (ADAS) or automated cruise. The driving-support control ECU 22 is connected to the second external communication processor 23 in order to acquire information necessary for ADAS, for example. The second external communication processor 23 performs, by using wireless communication such as 802.11p, communication with a roadside apparatus on a road and with other external devices, and performs the processing of receiving the status of traffic signals and distance to other information recording devices, for example.

The driving-support control ECU 22 and the second external communication processor 23 are connected to a fourth bus B4 that conforms to the standard of Local Interconnect Network (LIN), and constitute a network referred to as LIN, for example. The driving-support control ECU 22 and the second external communication processor 23 are connected to the in-vehicle gateway device 100 via the fourth bus B4.

The diagnostic communication unit 11 performs the processing of transmitting to external device diagnostic information collected from the respective ECUs included in the in-vehicle system 10, in order for the in-vehicle system 10 to perform self-failure diagnosis. The diagnostic communication unit 11 performs communication processing that conforms to such standard as ODB (ODB, ODB 1.5, and ODB-II). The diagnostic communication unit 11 is connected to the in-vehicle gateway device 100, and the diagnostic information on the respective ECUs included in the in-vehicle system 10 is transmitted to the external device from the diagnostic communication unit 11 via the in-vehicle gateway device 100.

The first bus B1, the second bus B2, the third bus B3, and the fourth bus B4 may be the buses of different communication standard, different communication speed, different communication rate, and different latency from one another, or may be of the same communication standard and have the same performance. When these buses are of the same communication standard and have the same performance, the buses do not necessarily need to be separate communication lines physically and the ECUs may be connected by the same communication line.

Next, the following describes in detail the in-vehicle gateway device 100 in the first embodiment. FIG. 2 is a block diagram illustrating an example of a functional configuration of the in-vehicle gateway device 100. The in-vehicle gateway device 100 in the first embodiment includes, as illustrated in FIG. 2, a communication processor 110, a routing processor 120, a storage unit 130, and a storage controller 140.

The communication processor 110 includes, as a plurality of internal communication processors, a first communication processor ill, a second communication processor 112, a third communication processor 113, a fourth communication processor 114, and a fifth communication processor 115. The first communication processor 111 performs the processing of communicating with the engine control ECU 12, the steering control ECU 13, the brake control ECU 14, the light control ECU 15, and the air-bag control ECU 16 that are connected to the first bus B1. The second communication processor 112 performs the processing of communicating with the air-conditioning control ECU 17, the sensor ECU 18, and the seat control ECU 19 that are connected to the second bus B2. The third communication processor 113 performs the processing of communicating with the video processing ECU 20 and the first external communication processor 21 that are connected to the third bus B3. The fourth communication processor 114 performs the processing of communicating with the driving-support control ECU 22 and the second external communication processor 23 that are connected to the fourth bus B4. The fifth communication processor 115 performs the processing of communicating with the diagnostic communication unit 11.

The routing processor 120 transfers data that is input by any of the communication processors included in the communication processor 110 to the other communication processors, and performs the processing of relaying the communication extending over the buses, and the communication with the diagnostic communication unit 11. That is, the routing processor 120 performs the processing of determining which bus the data input from is output to which bus, which ECU connected to which bus the data input from is output to which bus, and which ECU connected to which bus the data input from is output to which ECU connected to which bus. At this time, when the standards, protocols, and data formats of the buses differ, the routing processor 120 performs the processing of converting a protocol format.

The routing processor 120 includes a filtering processor 121 in the inside thereof. The filtering processor 121 performs, in accordance with the set policy, the processing of transmitting to the storage controller 140 a part of the data that is input to the routing processor 120.

Because the routing processor 120 relays the communication extending over the buses as described in the foregoing, the data transmitted and received among the ECUs extending over the buses is input to the routing processor 120. Even with the communication that is not extending over the buses, because the data broadcast on the bus is received by the communication processor 110, the data can be input to the routing processor 120. Although it depends on the status of the vehicle such as whether the ignition switch of the vehicle in which the in-vehicle system 10 is equipped is off, whether the vehicle is running or stopping, or whether the vehicle is communicating with an external device, because control commands and control data are output from many ECUs in the in-vehicle system 10, the amount of data the routing processor 120 receives and processes becomes huge. Thus, it is not realistic to store all of the data the routing processor 120 received into the storage unit 130. Consequently, the filtering processor 121 transmits, in accordance with the set policy, only the necessary data to the storage controller 140.

The filtering processor 121 may determine the data to transmit to the storage controller 140 in accordance with a predetermined fixed policy, or may determine, by making the policy of the filtering processor 121 variable, the data to transmit to the storage controller 140 in each case. It may be configured such that the policy that is set to the filtering processor 121 can be updated from the storage controller 140.

The storage unit 130 stores therein data that is output from the respective ECUs included in the in-vehicle system 10. As for the storage unit 130, a medium that records data such as a NAND flash memory and an HDD can be used, for example.

The storage controller 140 performs, in accordance with a certain rule, the processing of manipulating or filtering at least one of the data to store in the storage unit 130 and the data output from the storage unit 130.

In the first embodiment, the data that is output from the respective ECUs included in the in-vehicle system 10 is stored in the storage unit 130. The data stored in the storage unit 130 is used for a variety of purposes. For example, it is conceivable that, when an accident occurs on the vehicle in which the in-vehicle system 10 is installed, the data is used as the information for verifying afterward whether it was the accident caused by a mistake of an operator (a driver of the vehicle) or whether it was the accident caused due to a flaw in software. In some cases, a situation is assumed that it needs to provide the data to public institutions such as the police and a court, in order for the manufacturing vendor of the vehicle to prove that it was the accident caused by the mistake of the operator. Furthermore, it is conceivable that, by monitoring whether the operator is not performing an operation that is likely to lead to an accident such as rapid acceleration and a sudden start, the data is used for various services such as advice on the operation in consideration of fuel consumption and safe driving, and a discount in insurance premium. It is also conceivable that the manufacturing vendor of the vehicle conducts actual tests of the in-vehicle system 10 and the data is used as the information for evaluation to achieve improvement.

It is assumed that the in-vehicle system 10 performs communication with various external devices. Thus, there is a possibility of being attacked from various external devices. In general, in an information communication system, attacks are made by making misuse of flaws that designers and implementers do not intend. However, it is difficult to design and implement the in-vehicle system 10 in which flaws are completely eliminated by predicting all of the attacks in advance. It is desirable that the in-vehicle system 10 be equipped with the function of eliminating malicious commands and illegitimate data. However, even when such measures are taken, an attack may unfortunately be affected. At this time, even when a malicious command and illegitimate data have been accepted due to a flaw of the in-vehicle system 10, if it is possible to record what kind of information was transmitted to an external device, it can be analyzed afterward and be used for fixing the flaw. Thus, keeping data, which is output from the ECUs, stored in the in-vehicle system 10 is useful as an ex-post facto response.

In general, there are various ECUs included in the in-vehicle system 10 and the quality and characteristics of the in-vehicle system 10 vary depending on the ECUs and on the software installed therein. Thus, the data output from the ECUs very much includes know-how for configuring the in-vehicle system 10 easier to use for the operator. Accordingly, as for the manufacturing vendor of the vehicle, the data output from the ECUs needs to be kept secret from the manufacturing vendors of the competitors.

Furthermore, because a variety of use is conceivable for the groups of data that the ECUs output as in the foregoing, it is desirable to have a function of limiting the disclosing range of data such that all of the data stored in the storage unit 130 are disclosed to the manufacturing vendor of the vehicle and to the public institutions such as the police and a court, a part of the data is disclosed to an insurance company, and minimum data is disclosed to general users, for example.

Moreover, it is necessary to have a scheme that proves that the data is not being altered by the manufacturing vendor of the vehicle, or that prevents the data from being altered after having output from the in-vehicle gateway device 100 by anyone.

The in-vehicle gateway device 100 in the first embodiment includes, to satisfy these requests, the storage controller 140 that controls the input of data to the storage unit 130 and the output of data from the storage unit 130.

The storage controller 140 includes a record communication unit 141, an input controller 142, an output controller 143, and a storage communication unit 144. The record communication unit 141 performs the processing of communicating with the routing processor 120. The input controller 142 performs the processing of manipulation and filtering when inputting data to the storage unit 130. The output controller 143 performs the processing of manipulation and filtering when outputting data from the storage unit 130. The detail of the input controller 142 and the output controller 143 will be described later. The storage communication unit 144 performs the processing of transmitting data to the storage unit 130 and of receiving data from the storage unit 130.

The data transmitted to the storage controller 140 from the routing processor 120 is the data filtered out by the filtering processor 121 as described in the foregoing. However, the storage controller 140 may be configured to give the routing processor 120 the instruction of which data to transmit. For example, by monitoring the capacity of the storage unit 130, the storage controller 140 may request the routing processor 120 to change the policy of the filtering processor 121 so as to limit the data recorded into the storage unit 130 to prevent the data from overflowing in the storage unit 130 when a certain capacity is exceeded.

Figure 3B:
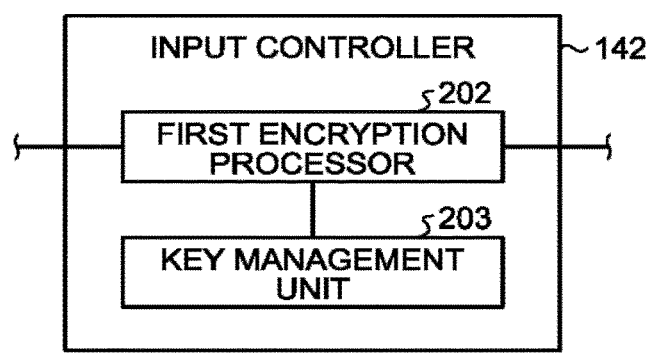
FIG. 3B is a block diagram illustrating an example of the internal configuration of the input controller.
Figure 3C:
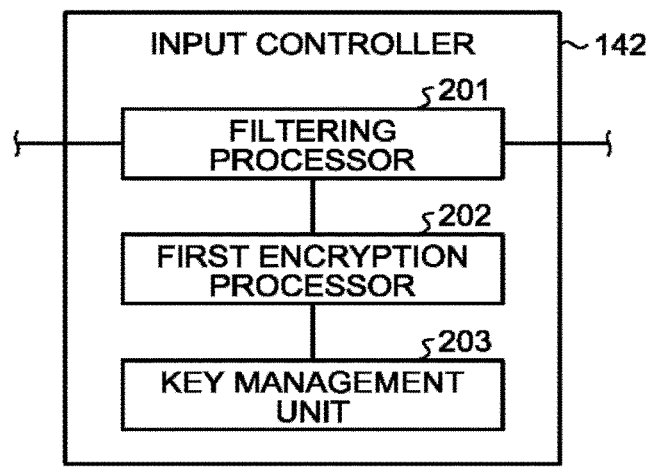
FIG. 3C is a block diagram illustrating an example of the internal configuration of the input controller.

The following describes specific examples of the input controller 142. FIGS. 3A to 3C are diagrams illustrating examples of the internal configuration of the input controller 142. The input controller 142 has the configuration that includes therein a filtering processor 201 as illustrated in FIG. 3A, the configuration that includes therein a first encryption processor 202 and a key management unit 203 as illustrated in FIG. 3B, and the configuration that includes therein the filtering processor 201, the first encryption processor 202, and the key management unit 203 as illustrated in FIG. 3C. The input controller 142 of the optimal configuration only needs to be selected, depending on the performance required for the in-vehicle system 10, and the size of capacity of the storage unit 130.

The filtering processor 201 is a processor that determines, on the data input from the routing processor 120, whether it is the data to store in the storage unit 130, and that performs the processing of manipulation of and filtering of the data. The filtering processor 201 may determine, in accordance with a predetermined fixed rule, whether the data input from the routing processor 120 is the data to store into the storage unit 130, or may be configured, by making the rule of the filtering processor 201 variable, to be able to update the rule to determine whether the data input from the routing processor 120 is the data to store into the storage unit 130.

The following lists examples of the rules that the filtering processor 201 uses.

Rule 1-1: Based on the bit rate of the data input from the routing processor 120, whether it is the data to store in the storage unit 130 is determined. For example, the filtering processor 201 measures the bit rate of the data input from the routing processor 120 and, when it exceeds a predetermined upper limit, performs the control of inputting to the storage unit 130 by thinning out the data.

Rule 1-2: Based on which bus the data input from the routing processor 120 is the data from, whether it is the data to store in the storage unit 130 is determined. For example, the filtering processor 201 controls the input of data to the storage unit 130 such that the input to the storage unit 130 is prohibited when the data input from the routing processor 120 is the data from the first bus B1 while the input to the storage unit 130 is permitted when the data is from the second bus B2.

Rule 1-3: Based on the type of data input from the routing processor 120, whether it is the data to store in the storage unit 130 is determined. For example, the filtering processor 201 controls the input of data to the storage unit 130 such that the input to the storage unit 130 is prohibited when the data input from the routing processor 120 is video data while the input to the storage unit 130 is permitted when the data is text data (including numeric data). In addition, the filtering processor 201 controls the input of data to the storage unit 130 depending on the type of data, such that the input of temporal information (time information) to the storage unit 130 is prohibited while the input of data other than that to the storage unit 130 is permitted, for example.

Rule 1-4: Based on the size of data input from the routing processor 120, whether it is the data to store in the storage unit 130 is determined. For example, the filtering processor 201 controls the input of data to the storage unit 130 such that the input to the storage unit 130 is prohibited when the size of data input from the routing processor 120 is equal to or greater than N kilobytes while the input to the storage unit 130 is permitted when it is smaller than that.

Rule 1-5: Based on which ECU the data input from the routing processor 120 is the data output from, whether it is the data to store in the storage unit 130 is determined. For example, the filtering processor 201 controls the input of data to the storage unit 130 such that the input to the storage unit 130 is permitted when the data is output from the air-conditioning control ECU 17 while the input to the storage unit 130 is prohibited when the data is output from the engine control ECU 12.

Rule 1-6: When the sensor ECU 18 includes a plurality of ECUs physically different from one another and these ECUs acquire an identical sensor signal and output it to different buses, depending on whether the data output from the ECUs match up, whether it is the data to store in the storage unit 130 is determined. For example, in order to make a sensor signal have redundancy, a plurality of ECUs included in the sensor ECU 18 may be connected to different buses and configured to acquire an identical sensor signal and output it to different buses. In such a configuration, the filtering processor 201 controls the input of data to the storage unit 130 such that only data that is output from any of the ECUs is input to the storage unit 130 while the data output from the ECUs match up, and such that the data that is output from those ECUs are input to the storage unit 130 when the data are different, for example. Accordingly, the occurrence of a problem due to a failure or an illegitimate access can be detected, and it is useful in cause investigation.

Rule 1-7: Depending on whether the authentication with an external device succeeded, whether the data input from the routing processor 120 is stored in the storage unit 130 is determined. For example, the filtering processor 201 controls the input of data to the storage unit 130 such that inputting to the storage unit 130 the data that is input from the routing processor 120 is permitted when a value that matches a predetermined password (PIN code) is transmitted from an external device via the first external communication processor 21, the second external communication processor 23, or the diagnostic communication unit 11 while the inputting to the storage unit 130 the data that is input from the routing processor 120 is prohibited when the value that matches the predetermined password (PIN code) is not transmitted.

The filtering processor 201 may perform control such that all of the data input from the routing processor 120 are input to the storage unit 130 when the authentication with the external device succeeded. However, the filtering processor 201 may filter the data that is input to the storage unit 130 in accordance with any of the above-described rule 1-1 to rule 1-6 or with a combination thereof. The authentication method with the external device is not limited to password authentication, and it may be public key authentication that uses public key algorithm such as RSA. In that case, the filtering processor 201 manages a secret key.

The above-described rule 1-7 is extremely useful when the manufacturing vendor of the vehicle on which the in-vehicle system 10 is equipped collects and analyzes data for testing. While the data for testing is the data not necessary to be stored in normal use for the operator and an insurance company or not wanted to be acquired, it is the data useful for the manufacturing vendor. That is, when redesigning the in-vehicle system 10, tests may be conducted on the actual device in order to acquire various certifications again. In this case, each ECU of the in-vehicle system 10 outputs the data for testing. At this time, if the authentication is performed based on a password or key information that only the manufacturing vendor can know the data that the ECU outputs for testing can be stored in the storage unit 130 only when the manufacturing vendor conducts the test.

Rule 1-8: Any combination of the above-described rule 1-1 to rule 1-7.

It may be configured such that, depending on the result detected by the above-described rule 1-1 to rule 1-8, by applying a different policy on whether to store in the storage unit 130 the data that the ECUs output, the storage of data (log storage) corresponding to a system status can be performed. For example, in the case of the rule 1-6, more logs may be collected or it may be switched to the log collection from a redundant system at the time of failure.

The input controller 142 may be configured such that, when inputting to the storage unit 130 the data that is input from the routing processor 120, the data is input to the storage unit 130 in a compression format by using a compression technology. For example, when the values of the same data are of the same value consecutively, the data is transmitted being compressed, not by transmitting the same data for the consecutive number of times.

The input controller 142 may, when inputting to the storage unit 130 the data that is input from the routing processor 120, apply statistical processing to the data. For example, when the same type of data from the same ECU is input from the routing processor 120 at the times X, Y, and Z, not by inputting three pieces of the data to the storage unit 130, an average value of the three pieces of the data may be input to the storage unit 130.

The input controller 142 may, when inputting to the storage unit 130 the data that is input from the routing processor 120, add to the data the information that identifies the operator of the vehicle in which the in-vehicle system 10 is equipped. The manner of operating the vehicle may be different depending on the habit of the operator. When analyzing data stored in the storage unit 130, if which operator operated can be distinguished when the ECUs output the data, it can be used for various services such as advice on the operation in consideration of fuel consumption and safe driving, and a discount in insurance premium.

Examples of the method of distinguishing the operator include a method of person recognition with an in-vehicle camera, a method of identifying by biological information such as fingerprint and voiceprint, a method of recognizing by a reader that reads belongings that identify the operator such as a driver's license and a credit card, and others. The information read by various readers such as the camera, a sensor, and a card reader is delivered to the input controller 142.

The determination in accordance with the rule 1-2 and the rule 1-5 may be performed by the filtering processor 121 of the routing processor 120 also. As described in the foregoing, depending on the standard of the bus, the data may be broadcast. In such a standard, the filtering processor 121 may not be able to determine a sender address and a destination address. In order to provide against such a case, in the first embodiment, it is configured such that the same processing is performed in the filtering processor 121 and in the input controller 142.

In the foregoing examples, the filtering processor 201 is configured to filter the data to store in the storage unit 130. However, the data filtering processing may be performed in the filtering processor 121. That is, it may be configured such that the filtering processor 201 holds any of the above-described rule 1-1 to rule 1-8 and sets the policy of the filtering processor 121 according to the rule, and such that, in accordance with the rule the filtering processor 201 holds, the filtering processor 121 performs the filtering processing.

The first encryption processor 202 performs encryption processing on the data that is input from the routing processor 120. The key management unit 203 manages the key that the first encryption processor 202 uses for the encryption processing. The encryption algorithm may be common-key encryption such as AES, or may be public key encryption such as RSA and elliptic curve encryption. When the input controller 142 has the configuration of FIG. 3B including the first encryption processor 202 and the key management unit 203, the encrypted data is stored in the storage unit 130. Accordingly, even when an attacker acquires the data by taking out only the storage unit 130, the attacker is unable to acquire the data in plain text, for example.

The encryption processing is not limited to keep secrecy, and it may be the processing of ensuring integrity by Message Authentication Code (MAC), for example. In this case, the first encryption processor 202 adds, by using algorithm such as HMAC, a MAC value to the data and inputs it to the storage unit 130, for example. Moreover, the encryption processing may be the processing of adding a signature. In this case, the first encryption processor 202 generates a signature value for the data by using the public key encryption such as RSA, adds the signature value to the data, and stores it in the storage unit 130, for example. Naturally, when the data size is large, a hash value may be calculated by using hash algorithm such as SHA-1, and the signature value for the hash value may be calculated, for example.

As illustrated in FIG. 3C, in the input controller 142 that has the configuration including therein the filtering processor 201, the first encryption processor 202, and the key management unit 203, the filtering processor 201 selects which data the first encryption processor 202 encrypts. In this case, it is determined by the filtering processor 201 whether not to store the data input from the routing processor 120 in the storage unit 130, whether to store the data in the storage unit 130 by applying the encryption processing by the first encryption processor 202, or whether to store the data in the storage unit 130 in plain text. The determination processing by the filtering processor 201 can be performed in accordance with any of the above-described rule 1-1 to rule 1-8, for example.

When the first encryption processor 202 performs the encryption processing on the data to store in the storage unit 130, the encryption processing using a different key depending on the output destination of the data may be performed. That is, by differentiating keys used in encryption processing, a person capable of accessing may be distinguished such that only the manufacturing vendor and public institutions can decrypt all of the data while an insurance company can decrypt certain data only, for example. In the same manner, the encryption processing using different encryption algorithm depending on the output destination of the data may be performed.

Figure 4A:
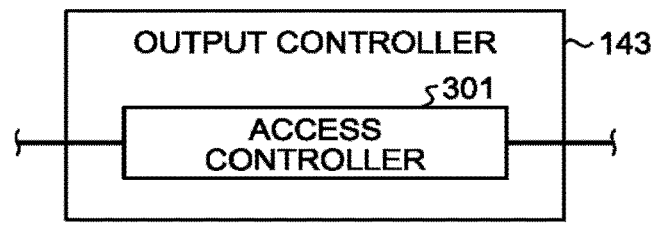
FIG. 4A is a block diagram illustrating an example of the internal configuration of an output controller.
Figure 4B:
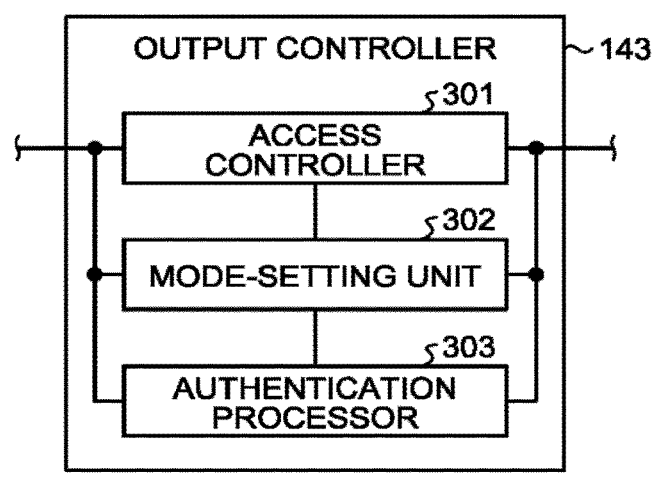
FIG. 4B is a block diagram illustrating an example of the internal configuration of the output controller.
Figure 4C:
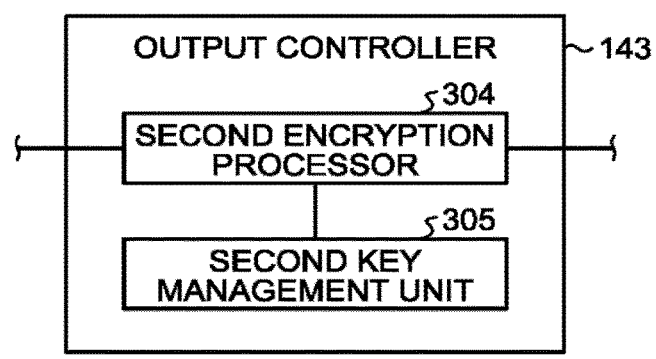
FIG. 4C is a block diagram illustrating an example of the internal configuration of the output controller.
Figure 4D:
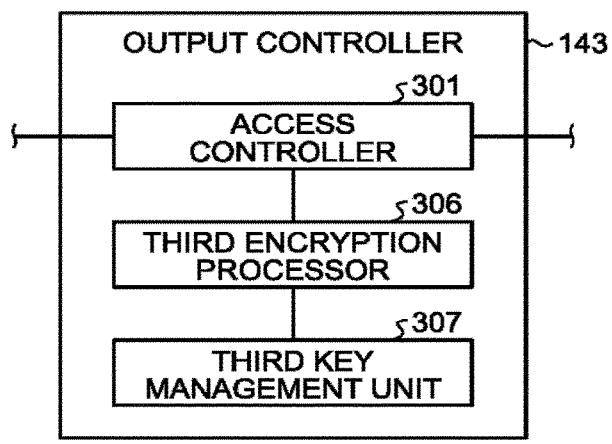
FIG. 4D is a block diagram illustrating an example of the internal configuration of the output controller.
Figure 4E:
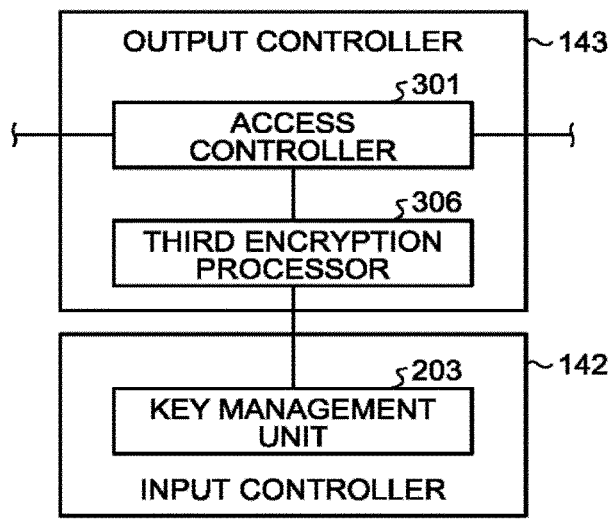
FIG. 4E is a block diagram illustrating an example of the internal configuration of the output controller.
Figure 4F:
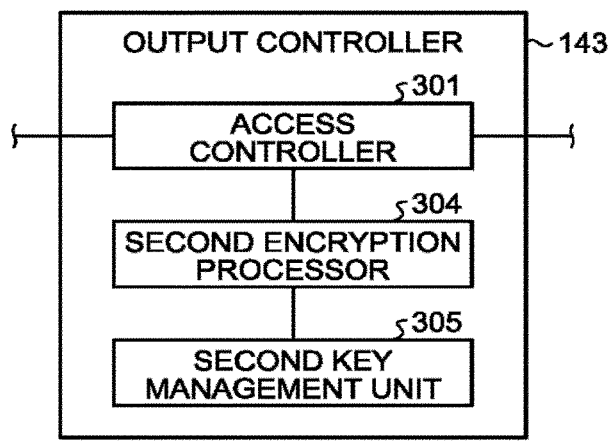
FIG. 4F is a block diagram illustrating an example of the internal configuration of the output controller.

Next, the following describes specific examples of the output controller 143. FIGS. 4A to 4F are diagrams illustrating examples of the internal configuration of the output controller 143. The output controller 143 has the configuration that includes therein an access controller 301 as illustrated in FIG. 4A, the configuration that includes therein the access controller 301, a mode-setting unit 302, and an authentication processor 303 as illustrated in FIG. 4B, the configuration that includes therein a second encryption processor 304, and a second key management unit 305 as illustrated in FIG. 4C, the configuration that includes therein the access controller 301, a third encryption processor 306, and a third key management unit 307 as illustrated in FIG. 4D, the configuration that includes therein the access controller 301 and the third encryption processor 306 as illustrated in FIG. 4E, and the configuration that includes therein the access controller 301, the second encryption processor 304, and the second key management unit 305 as illustrated in FIG. 4F. The output controller 143 of the optimal configuration only needs to be selected, depending on the performance, security level, and others that are required for the in-vehicle system 10.

The access controller 301 is a processor that determines, on the data for which the output from the storage unit 130 was requested, whether it is the data that can be output, and that performs the processing of manipulation of and filtering of the data. The access controller 301 may determine, in accordance with a predetermined fixed rule, whether the data for which the output was requested is the data that can be output, or may be configured, by making the rule of the access controller 301 variable, to be able to update the rule to determine whether the data for which the output was requested is the data that can be output.

The following lists examples of the rules that the access controller 301 uses.

Rule 2-1: Based on the bit rate of the data for which the output was requested in transmitting to the routing processor 120, whether it is the data that can be output is determined. For example, the access controller 301 measures the bit rate of the data for which the output was requested and, when it exceeds a predetermined upper limit, the access controller 301 performs the control so as to transmit data to the routing processor 120 by thinning out the data.

Rule 2-2: Depending on the output destination of the data for which the output was requested, whether it is the data that can be output is determined. For example, the access controller 301 controls the output of the data stored in the storage unit 130 such that the output is prohibited when the data for which the output was requested is transmitted to an external device from the diagnostic communication unit 11 while the output is permitted when it is transmitted to the external device from the second external communication processor 23.

Rule 2-3: Based on the type of the data for which the output was requested, whether it is the data that can be output is determined. For example, the access controller 301 controls the output of the data stored in the storage unit 130 such that the output is prohibited when the data for which the output was requested is video data while the output is permitted when it is text data (including numeric data). In addition, the access controller 301 controls the output of the data stored in the storage unit 130 depending on the type of data, such that the output of temporal information (time information) is prohibited while the output of the data other than that is permitted, for example.

Rule 2-4: Based on the size of the data for which the output was requested, whether it is the data that can be output is determined. For example, the access controller 301 controls the output of the data stored in the storage unit 130 such that the output is prohibited when the size of the data for which the output was requested is equal to or greater than N kilobytes while the output is permitted when it is smaller than that.

Rule 2-5: Depending on which ECU has output the data for which the output was requested, whether it is the data that can be output is determined. For example, the access controller 301 controls the output of the data stored in the storage unit 130 such that the output is permitted when the data for which the output was requested is the data that the air-conditioning control ECU 17 has output while the output is prohibited when it is the data that the engine control ECU 12 has output. In this case, when storing data in the storage unit 130, the input controller 142 may store the data by adding information indicative of which ECU the data was input from.

Rule 2-6: In the configuration that the sensor ECU 18 includes a plurality of ECUs physically different from one another and that these ECUs acquire an identical sensor signal and output it to different buses, when the data that the ECUs acquired the identical signal and output it is stored in the storage unit 130, depending on whether the data output from the ECUs matches up, whether it is the data that can be output is determined. For example, the access controller 301 controls the output of the data stored in the storage unit 130 such that the output is permitted for the analysis of an attack or an error when the data that the ECUs output is different while the output is prohibited when the data matches up. In this case, when storing data in the storage unit 130, the input controller 142 may store the data by adding information indicating that the data were input from the identical sensor.

Rule 2-7: Depending on whether the authentication with an external device succeeded, whether to output the data for which the output was requested is determined. For example, the access controller 301 controls the output of the data stored in the storage unit 130 such that the output of the data for which the output was requested is permitted when a value that matches a predetermined password (PIN code) is transmitted from an external device via the first external communication processor 21, the second external communication processor 23, or the diagnostic communication unit 11 while the output of the data for which the output was requested is prohibited when the value that matches the predetermined password (PIN code) is not transmitted.

The access controller 301 may permit the output of all of the data for which the output was requested when the authentication with the external device succeeded. However, the access controller 301 may filter the data for which the output is permitted, in accordance with any of the above-described rule 2-1 to rule 2-6 or with a combination thereof. The authentication method with the external device is not limited to password authentication, and it may be public key authentication that uses public key algorithm such as RSA. In that case, the access controller 301 manages a secret key.

Rule 2-8: Any combination of the above-described rule 2-1 to rule 2-7.

The output controller 143, when the data stored in the storage unit 130 is compressed by a compression technology, performs expansion processing on the data.

The output controller 143 may apply statistical processing to the data stored in the storage unit 130 to output the data. For example, when the same type of data from the same ECU are stored in the storage unit 130 at the times X, Y, and Z, not by outputting three pieces of the data, an average value of the three pieces of the data may be output.

The mode-setting unit 302 performs the processing of setting of enabling or disabling the operation of the access controller 301. When the access controller 301 is set to be enabled by the mode-setting unit 302, the filtering and manipulation of the data are performed by the access controller 301 in accordance with any of the above-described rule 2-1 to rule 2-8. Meanwhile, when the access controller 301 is set to be disabled, the data for which the output was requested is output from the storage unit 130 as is.

The authentication processor 303 performs authentication processing to limit the operation of the mode-setting unit 302. That is, only when the authentication processor 303 succeeded in authentication, the mode-setting unit 302 can set enabling or disabling the access controller 301. Accordingly, it can be prevented that the setting of the access controller 301 is illegitimately changed by an attacker who does not know the password or the secret key. Examples of the authentication method include a method of using a password (PIN code) predetermined in the authentication processor 303, and a method of using public key authentication using public key algorithm such as RSA and elliptic curve encryption.

The mode-setting unit 302 may perform not only the processing of setting of enabling or disabling the operation of the access controller 301 but also the setting of changing the rule that the access controller 301 uses. For example, while the rule 2-1 is applied to the access controller 301, when the authentication by the authentication processor 303 succeeds, it may be configured so that the mode-setting unit 302 sets applying the rule 2-2 to the access controller 301.

The second encryption processor 304 performs encryption processing on the data for which the output from the storage unit 130 was requested. The second key management unit 305 manages the key that the second encryption processor 304 uses for the encryption processing. The encryption algorithm may be common-key encryption such as AES, or may be public key encryption such as RSA and elliptic curve encryption. When the output controller 143 has the configuration of FIG. 4C including the second encryption processor 304 and the second key management unit 305, the data that is output from the storage unit 130 is encrypted. Then, only when having the same value as the key that the second key management unit 305 manages in the case of a common key, or having the value of a secret key corresponding to the public key of the second key management unit 305 in the case of a public key, the data that is output from the storage unit 130 can be decrypted to a plain text. Thus, because an attacker who does not know the value of the key is unable to decrypt the encrypted data, the data of the storage unit 130 can be prevented from being acquired by the attacker in plain text.

The encryption processing is not limited to keep secrecy, and it may be the processing of ensuring integrity by such as Message Authentication Code (MAC). In this case, the second encryption processor 304 adds, by using algorithm such as HMAC, a MAC value to the data that is output from the storage unit 130, for example. Moreover, the encryption processing may be the processing of adding a signature. In this case, the second encryption processor 304 generates a signature value for the data by using the public key encryption such as RSA, and adds the signature value to the data that is output from the storage unit 130, for example. Naturally, when the data size is large, a hash value may be calculated by using hash algorithm such as SHA-1, and the signature value for the hash value may be calculated, for example.

As illustrated in FIG. 4F, in the output controller 143 that has the configuration including therein the access controller 301, the second encryption processor 304, and the second key management unit 305, out of the data stored in the storage unit 130 in plain text, the access controller 301 selects which data the second encryption processor 304 encrypts. In this case, it is determined by the access controller 301 whether to output the data output from the storage unit 130 after performing the encryption processing by the second encryption processor 304, or whether to output the data in plain text as is. The determination processing by the access controller 301 can be performed in accordance with any of the above-described rule 2-1 to rule 2-8, for example.

When the second encryption processor 304 performs the encryption processing on the data that is output from the storage unit 130, the encryption processing using a different key depending on the output destination of the data may be performed. That is, by differentiating keys used in encryption processing, a person capable of accessing may be distinguished such that only the manufacturing vendor and public institutions can decrypt all of the data while an insurance company can decrypt certain data only, for example.

The third encryption processor 306, when the data stored in the storage unit 130 is encrypted by the first encryption processor 202 of the input controller 142, applies decryption processing to the data output from the storage unit 130. The third key management unit 307 manages the key that the third encryption processor 306 uses. When the data encrypted by the first encryption processor 202 is stored in the storage unit 130, out of the data stored in the storage unit 130, the access controller 301 selects which data the third encryption processor 306 decrypts. That is, it is determined by the access controller 301 whether to output the data output from the storage unit 130 as plain text by decrypting the data by the third encryption processor 306, or whether to output the data in encrypted text as is. The determination processing by the access controller 301 can be performed in accordance with any of the above-described rule 2-1 to rule 2-8, for example.

When the common-key encryption is used, the same value as the value stored in the key management unit 203 of the input controller 142 may be stored in the third key management unit 307, and as in the configuration illustrated in FIG. 4E, without the third key management unit 307 being provided in the output controller 143, the third encryption processor 306 may acquire the key from the key management unit 203 of the input controller 142.

Examples of the method of requesting the output of the data stored in the storage unit 130 include a method that an ECU included in the in-vehicle system 10 transmits an output request message, and a method that an external device transmits an output request message via any of the diagnostic communication unit 11, the first external communication processor 21, and the second external communication processor 23. Examples of the output destination of the data stored in the storage unit 130 include outputting to an ECU via the internal bus, and outputting to an external device via any of the diagnostic communication unit 11, the first external communication processor 21, and the second external communication processor 23. When outputting the data to the external device, it may be output in a wired manner or in a wireless manner. The information specifying the output destination may be added to the output request message that requests the output of the data stored in the storage unit 130, or the output destination may be specified in the in-vehicle gateway device 100 in advance. Examples of the information to specify the output destination include a way to specify a bus, a way to specify an ECU, and a way to specify the diagnostic communication unit 11.

When performing any of the authentication and encryption, it may be configured so that the access controller 301 performs the processing of determining which bus or which ECU the request is from and such that the operation of the access controller 301 can be changed depending on the bus or the ECU. For example, it may be configured such that, when changing the operation of the access controller 301 from the first bus B1 via the routing processor 120, the mode-setting unit 302 is disabled so that the operation of the access controller 301 can be enabled and disabled, and such that, when changing the operation of the access controller 301 from the diagnostic communication unit 11, the mode-setting unit 302 is enabled so that the setting of the access controller 301 cannot be changed unless the authentication with the authentication processor 303 succeeded. In the same manner, it may be configured such that, when the output of the data stored in the storage unit 130 was requested from the first bus B1 via the routing processor 120, the data is output in plain text as is, and such that, when the output of the data stored in the storage unit 130 was requested from the diagnostic communication unit 11, the data is output and encrypted by the second encryption processor 304.

In the above-described example, the input controller 142 performs the manipulation and filtering of the data when the data is input to the storage unit 130 and the output controller 143 performs the manipulation and filtering of the data when the data is output from the storage unit 130. However, it may be configured that the manipulation and filtering of the data is performed, either only when the data is input to the storage unit 130 or only when the data is output from the storage unit 130.

As has been described in detail with specific examples in the foregoing, the in-vehicle gateway device 100 in the first embodiment stores the data that the ECUs output into the storage unit 130 and, when the data stored in the storage unit 130 is output, manipulates or filters the data in accordance with a certain rule. Thus, according to the in-vehicle gateway device 100, the output of the data can be limited depending on the purpose of the data while protecting the data stored in the storage unit 130. Consequently, the inconvenience of the data stored in the storage unit 130 being acquired by a malicious third person, and the data stored in the storage unit 130 being carelessly disclosed can be effectively suppressed.

Furthermore, according to the first embodiment, by manipulating or filtering the data to store in the storage unit 130, the overflow of data from the storage unit 130 can be suppressed and, because the bus width of the storage unit 130 can be made small, the cost of the storage unit 130 can be reduced.

Figure 5:
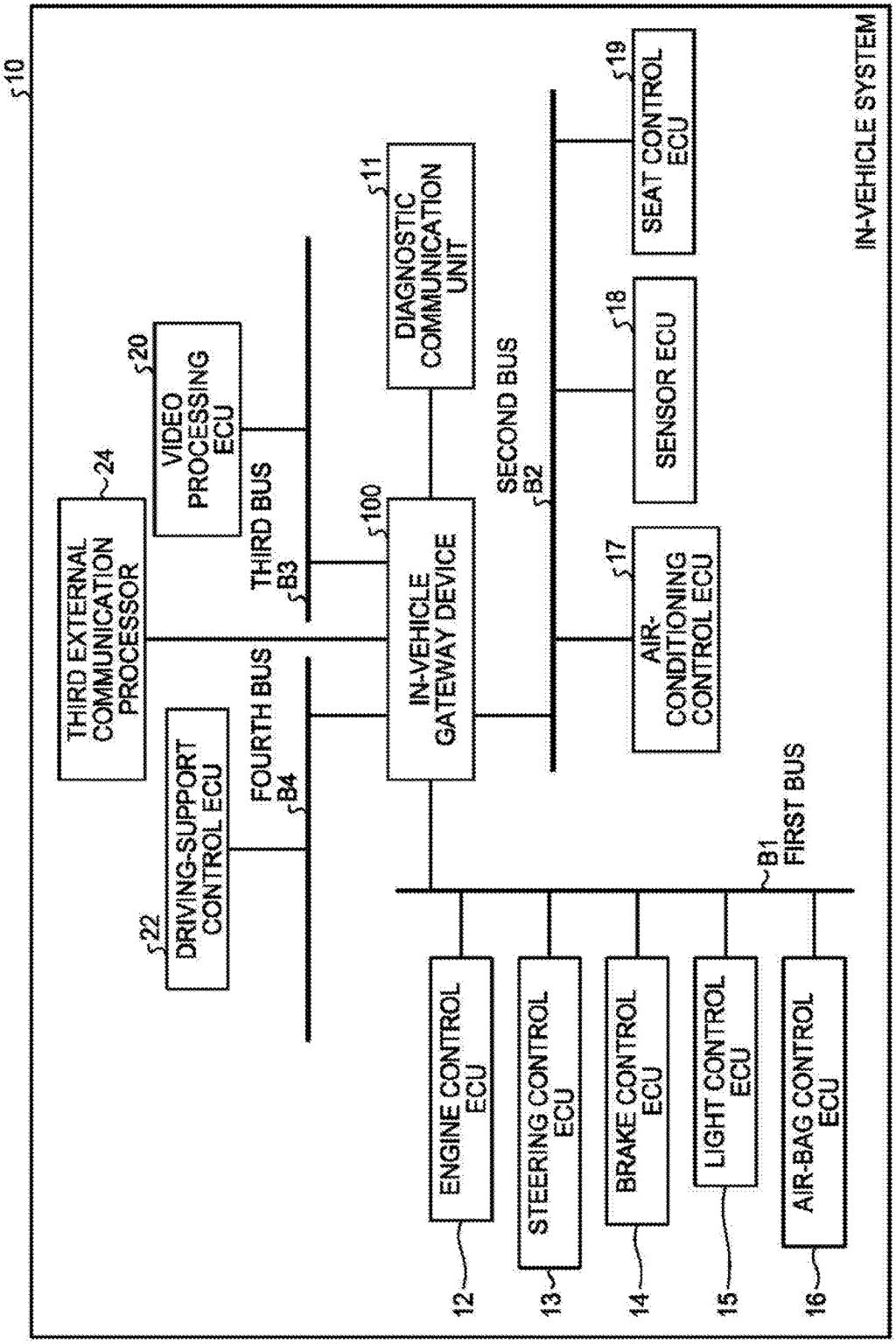
FIG. 5 is a block diagram illustrating a schematic example of an in-vehicle system that includes a third external communication processor.

In the configuration of the in-vehicle system 10 illustrated in FIG. 1, the video processing ECU 20 and the driving-support control ECU 22 are connected to separate communication processors (the first external communication processor 21 and the second external communication processor 23, respectively) in order to perform communication with the outside. However, it may be configured such that the communication processors to perform communication with the outside are put together into one processor. FIG. 5 illustrates an example of the configuration of such an in-vehicle system 10.

The in-vehicle system 10 illustrated in FIG. 5 includes, in place of the first external communication processor 21 and the second external communication processor 23 in FIG. 1, a third external communication processor 24 being connected to the in-vehicle gateway device 100. The third external communication processor 24 performs the processing of communicating with the Internet, a roadside apparatus, and other external devices by using a mobile communication network such as the 3GPP (registered trademark) and LTE (registered trademark), and by using wireless communication such as Wi-Fi (registered trademark), Bluetooth (registered trademark), and 802.11p, for example.

Figure 6:
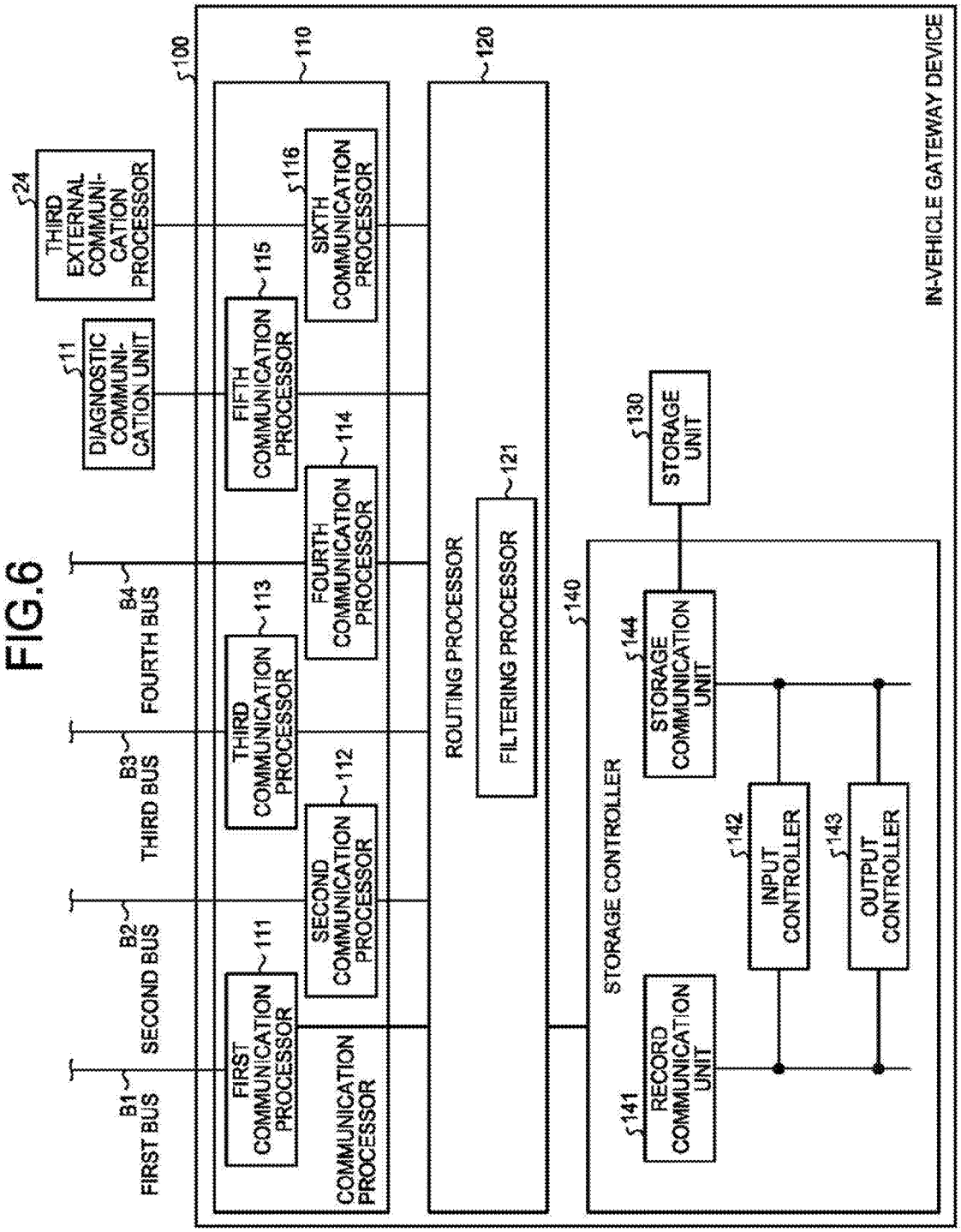
FIG. 6 is a block diagram illustrating an example of the configuration of an in-vehicle gateway device corresponding to the in-vehicle system in FIG. 5.

In the in-vehicle system 10 of the configuration illustrated in FIG. 1, the video processing ECU 20 performs communication with the outside by using the first external communication processor 21 directly without going through the in-vehicle gateway device 100. In the same manner, the driving-support control ECU 22 also performs communication with the outside by using the second external communication processor 23 directly without going through the in-vehicle gateway device 100. However, in the in-vehicle system 10 for which the configuration is illustrated in FIG. 5, the video processing ECU 20 and the driving-support control ECU 22 need to go through the in-vehicle gateway device 100 in order to perform communication with the outside by using the third external communication processor 24. FIG. 6 illustrates an example of the configuration of such an in-vehicle gateway device 100.

The in-vehicle gateway device 100 illustrated in FIG. 6 is different, as compared with the configuration illustrated in FIG. 2, in that the communication processor 110 includes a sixth communication processor 116 in addition. The sixth communication processor 116 performs the processing of communicating with the third external communication processor 24. When the video processing ECU 20 performs communication with the outside by using the third external communication processor 24, the video processing ECU 20 and the third external communication processor 24 are connected via the third communication processor 113, the routing processor 120, and the sixth communication processor 116. When the driving-support control ECU 22 performs communication with the outside by using the third external communication processor 24, the driving-support control ECU 22 and the third external communication processor 24 are connected via the fourth communication processor 114, the routing processor 120, and the sixth communication processor 116.

Figure 7:
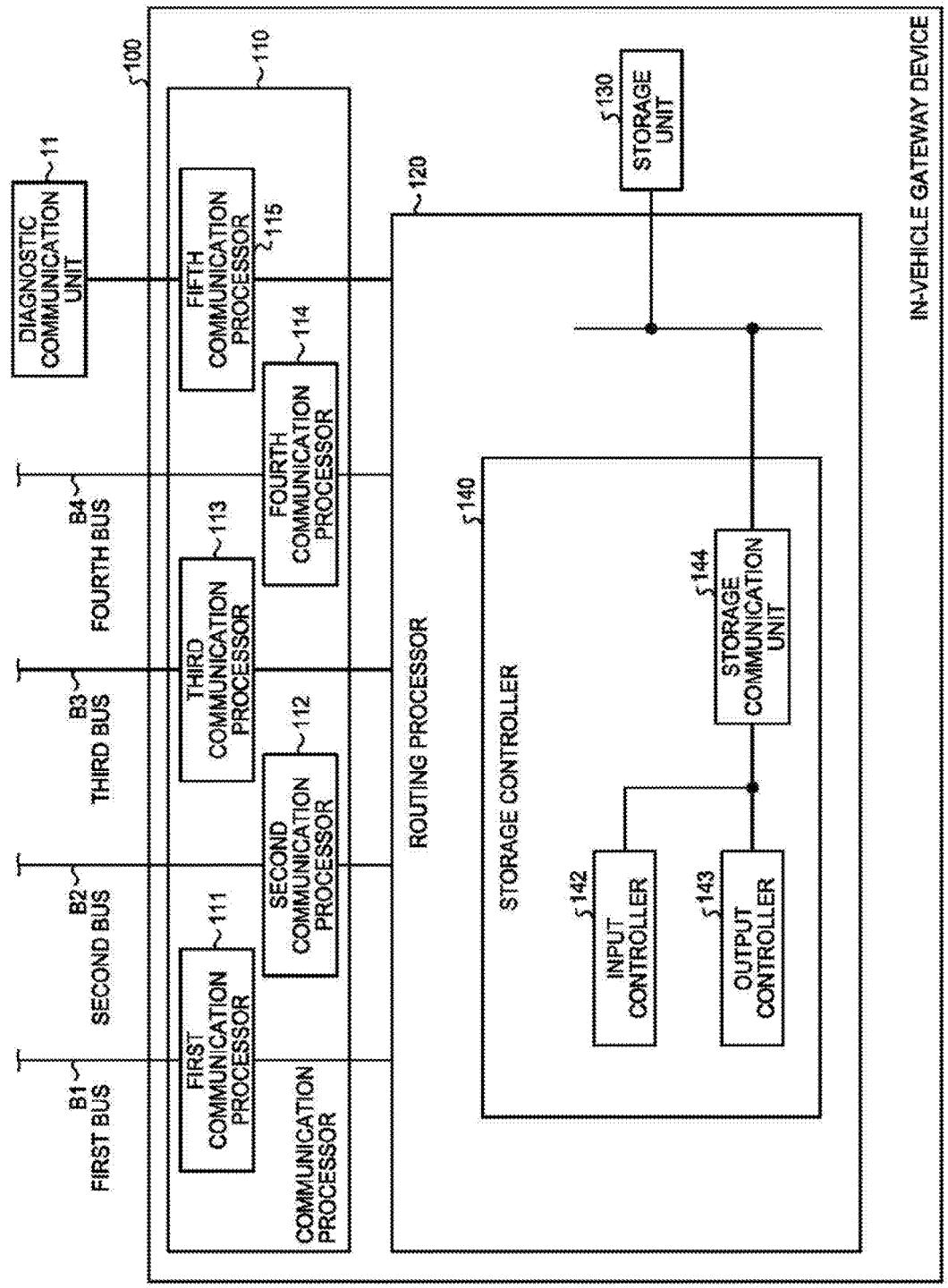
FIG. 7 is a block diagram illustrating an example of the configuration of the in-vehicle gateway device in which a storage controller is incorporated in a routing processor.

In the configuration of the in-vehicle gateway device 100 illustrated in FIG. 2, the routing processor 120 and the storage controller 140 are separately provided. However, it is also possible to configure the storage controller 140 to be incorporated in the routing processor 120. FIG. 7 illustrates an example of the configuration of such an in-vehicle gateway device 100.

In the in-vehicle gateway device 100 illustrated in FIG. 7, the storage controller 140 is being incorporated in the routing processor 120. Thus, the storage controller 140 is not provided with the record communication unit 141.

In the in-vehicle gateway device 100 of the configuration illustrated in FIG. 2, the routing processor 120 performs the processing of transmitting only the necessary data to the storage controller 140 in accordance with the set policy. In contrast, in the in-vehicle gateway device 100 of the configuration illustrated in FIG. 7, the input controller 142 of the storage controller 140 performs this processing. That is, the input controller 142 performs filtering of the data input to the routing processor 120 in accordance with the policy set in the routing processor 120 and, in accordance with any of the above-described rule 1-1 to rule 1-8, performs the manipulation and filtering of the data to store into the storage unit 130.

In the in-vehicle gateway device 100 of the configuration illustrated in FIG. 2, the data output from the storage unit 130 is manipulated and filtered by the output controller 143 and is transmitted to the routing processor 120 from the record communication unit 141. In contrast, in the in-vehicle gateway device 100 of the configuration illustrated in FIG. 7, because the storage controller 140 is being incorporated in the routing processor 120, the output controller 143 performs the processing of directly delivering the manipulated and filtered data to the routing processor 120. The routing processor 120 performs the processing of transferring the data to the first bus B1, the second bus B2, the third bus B3, the fourth bus B4, or the diagnostic communication unit 11.

Second Embodiment

Next, the following describes a second embodiment. In the first embodiment, the data that is output from the ECUs included in the in-vehicle system 10 is stored in the storage unit 130. In contrast, the second embodiment is different from the first embodiment in that, in addition to the data output from the ECUs, information concerning the firmware of the ECUs is stored as system information. The following describes only the difference from the first embodiment.

In general, the in-vehicle system 10 is equipped with many ECUs of various types. In FIG. 1, the engine control ECU 12 and others are illustrated as one example of those many ECUs. However, various ECUs are equipped in addition to those. The in-vehicle system 10 is generally equipped with ECUs provided by a plurality of different vendors. Among those ECUs, some are implemented by hardware only and the others are structured by hardware and software (firmware). Of those structured by hardware and firmware, there are ones that the firmware is embedded at the time of factory shipment and is not possible to renew (update) after the factory shipment, while there are ones that have a function of updating the firmware to new firmware later for the purpose of addition of functions, improvement of performance, remediation of flaws, and others, after shipping from the factory in ECU alone or being assembled as the in-vehicle system 10.

At this time, a problem is the updating of the firmware. In the case of an IT system comprised of personal computers (PCs), because each of the PCs is often connected to the Internet at all times, each PC can check regularly whether the latest firmware is being distributed on a server and, at the same time when the firmware is provided, the PC can update it.

However, the in-vehicle system 10 is not always connected to the server that distributes the firmware via a network at all times. For example, there may be cases of not being able to perform communication with an external device when a vehicle in which the in-vehicle system 10 is equipped is running in a tunnel or an underpass, or there may be cases of using (turning the ignition on) the vehicle on weekend only. Accordingly, not all of the in-vehicle systems 10 have acquired and installed the latest firmware for all of the ECUs. Furthermore, due to a failure of the ECU, even if it is the in-vehicle system 10 of the same type, there may be a situation in which the latest firmware is installed in one ECU while older firmware is installed in another ECU.

Moreover, as described in the foregoing, because the vendors that provide the ECUs are different and the functions of the respective ECUs are different from one another, each ECU is expected to be updated individually for each ECU. Accordingly, even if it is the in-vehicle system 10 of the same type provided by the same vendor, the number of combinations of the firmware versions is substantial. For example, conceivable is a situation in which a flaw occurs by the combination of specific firmware versions such that the flaw occurs only when the version of one ECU is X and the version of another ECU is Y.

Furthermore, in terms of security, the success or failure of attack is different by the configuration of the in-vehicle system 10, and a specific attack may be effected by the combination of specific firmware. As just described, the system configuration of the in-vehicle system 10 can be an important clue for resolving a problem such as a failure or an attack. Supposing that an accident has occurred, the manufacturing vendor of the vehicle needs the work of checking and analyzing what failure is the cause. However, if the combination of the firmware is not known, the investigation costs significantly.

From the above description, if the manufacturing vendor of the vehicle can comprehend the status of the firmware of each ECU together with the data output from the ECU, it is conceivable that, because the reproduction becomes easier, the analysis to investigate the cause becomes easier. Moreover, it is necessary for the manufacturing vendor of the vehicle to keep the information concerning the system configuration stored in the in-vehicle system 10 in order to efficiently analyze ex-post facto whether an effective attack has occurred from the outside. However, the type of data to be stored, the management method thereof, and the output method thereof are not disclosed.

In the second embodiment, the in-vehicle gateway device 100 stores, in addition to the data output from the ECUs, the information concerning the firmware of the ECUs as system information and, when analyzing the data, enables the status of the firmware of each ECU to be comprehended, such that the analysis of the data can be performed easily and efficiently.

Figure 8:
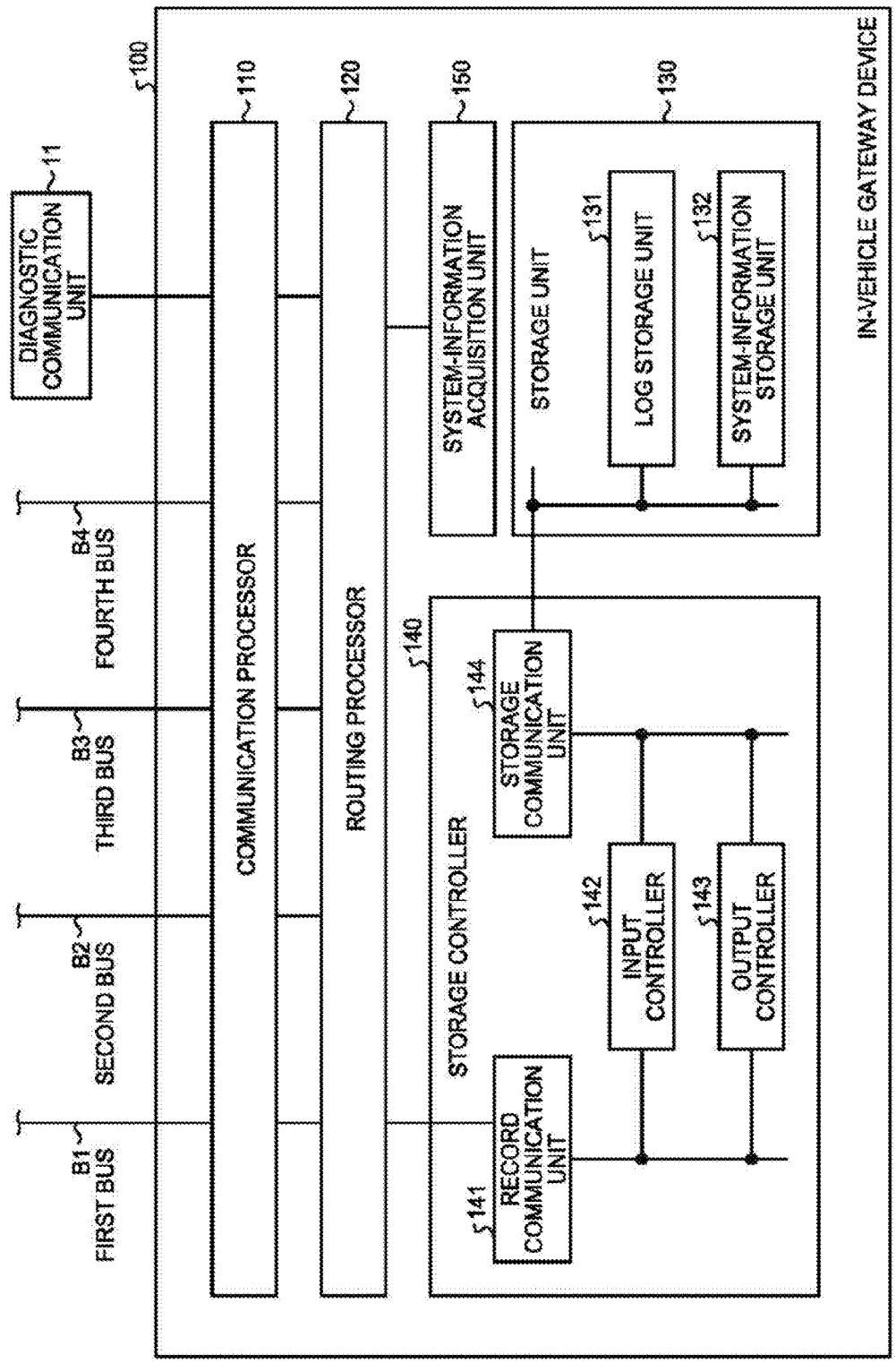
FIG. 8 is a block diagram illustrating an example of a functional configuration of an in-vehicle gateway device according to a second embodiment.

FIG. 8 is a block diagram illustrating an example of a functional configuration of the in-vehicle gateway device 100 in the second embodiment. As compared with the configuration in the first embodiment illustrated in FIG. 2, it is different in that a system-information acquisition unit 150 is added, and in that the storage unit 130 includes a log storage unit 131 and a system-information storage unit 132.

The system-information acquisition unit 150 performs the processing of acquiring the information concerning the firmware of each ECU included in the in-vehicle system 10. The information concerning the firmware of the ECU may be the information on version of the firmware, and may be a hash value of the firmware. The information concerning the firmware of the ECU may further include metadata of the firmware such as date, the size of the firmware, a signature attached to the firmware, the information concerning the vendor that provides the firmware, and others. The information concerning the firmware may be the information concerning a RAM image in operation.

The system-information acquisition unit 150 transmits the acquired information concerning the firmware of the ECUs to the storage unit 130. Examples of the timing of the system-information acquisition unit 150 to acquire the information concerning the firmware of the ECUs include a way of acquiring it regularly from each ECU, a way of acquiring it when the ignition of the vehicle is turned on, a way of acquiring it in response to instructions given from an external device, a way of acquiring it when an abnormality such as a failure of an ECU is detected, a way of collecting it in response to instructions given from a specific ECU. The instructions given from the specific ECU represent a situation in which the air-bag control ECU 16 transmits the instructions to the system-information acquisition unit 150 when an event such as collision of the in-vehicle system 10 was detected, for example. When the information concerning the firmware of the ECUs is updated, the information concerning the firmware before updating may be overwritten or, without erasing the information before the updating, it may be left as history and may be appended.

In the in-vehicle gateway device 100 in the second embodiment, the storage unit 130 is configured with the log storage unit 131 and the system-information storage unit 132. The log storage unit 131 has the function that is identical to that of the storage unit 130 in the first embodiment. That is, the log storage unit 131 stores therein the data that the ECUs output and that is manipulated and filtered by the input controller 142 of the storage controller 140. Meanwhile, the system-information storage unit 132 stores therein the information concerning the firmware of the ECUs that the system-information acquisition unit 150 acquired, as the system information.

In the first embodiment, described has been a scheme that the input controller 142 manipulates and filters the data the ECUs output and stores it in the storage unit 130. On the information concerning the firmware of the ECUs also, it may be configured in the same manner to manipulate and filter it, and to store it in the system-information storage unit 132. For example, the filtering processor 201 of the input controller 142 may be configured to determine, on the information concerning the firmware of the ECUs the system-information acquisition unit 150 acquired, whether to store it in the system-information storage unit 132, depending on which bus it is output to, which bus it was input from, and which ECU it was acquired from, and configured to store only the one that was determined to be stored. This determination may be performed independent of the data the ECUs output. That is, the determination in which storing the data that one ECU outputs to the log storage unit 131 is prohibited while storing the information concerning the firmware of the ECU to the system-information storage unit 132 is permitted may be performed.

In the same manner, it may be determined separately whether to encrypt the data that one ECU outputs by the first encryption processor 202 and whether to encrypt the information concerning the firmware of the ECU by the first encryption processor 202. When both are encrypted, the key management unit 203 may be configured to manage a plurality of keys so as to carry out the encryption with separate keys.

In the first embodiment, described has been a scheme that the output controller 143 manipulates and filters the data that is output from the storage unit 130. On the information concerning the firmware of the ECUs also, it may be configured in the same manner to manipulate and filter the data that is output from the system-information storage unit 132. For example, the access controller 301 of the output controller 143 may be configured to determine, on the information concerning the firmware of the ECUs for which the output was requested from the system-information storage unit 132, whether to permit the output, depending on which bus it is output to, which bus it was input from, and which ECU it was acquired from, and configured to output only the one that was determined to permit outputting. This determination may be performed independent of the data the ECUs output. That is, the determination in which outputting the data that one ECU outputs from the log storage unit 131 is prohibited while outputting the information concerning the firmware of the ECU from the system-information storage unit 132 is permitted may be performed.

In the same manner, on the data that one ECU outputs and the information concerning the firmware of the ECU, it may be determined separately whether to encrypt them by the second encryption processor 304 and whether to decrypt them by the third encryption processor 306. When both are encrypted and decrypted, the second key management unit 305 and the third key management unit 307 may be configured to manage a plurality of keys so as to carry out the encryption with separate keys. Moreover, as for the setting of the mode-setting unit 302, it may be performed separately for the data that one ECU outputs and the information concerning the firmware of the ECU.

As described in the foregoing, the in-vehicle gateway device 100 in the second embodiment stores in the log storage unit 131 the data that ECUs output and stores in the system-information storage unit 132 the information concerning the firmware of the ECUs. Accordingly, when the manufacturing vendor of the vehicle analyzes the data that the ECUs output, the analysis can be performed by acquiring the information concerning the firmware of the ECUs also, and thus the analysis of the data can be performed easily and efficiently, for example.

Figure 9:
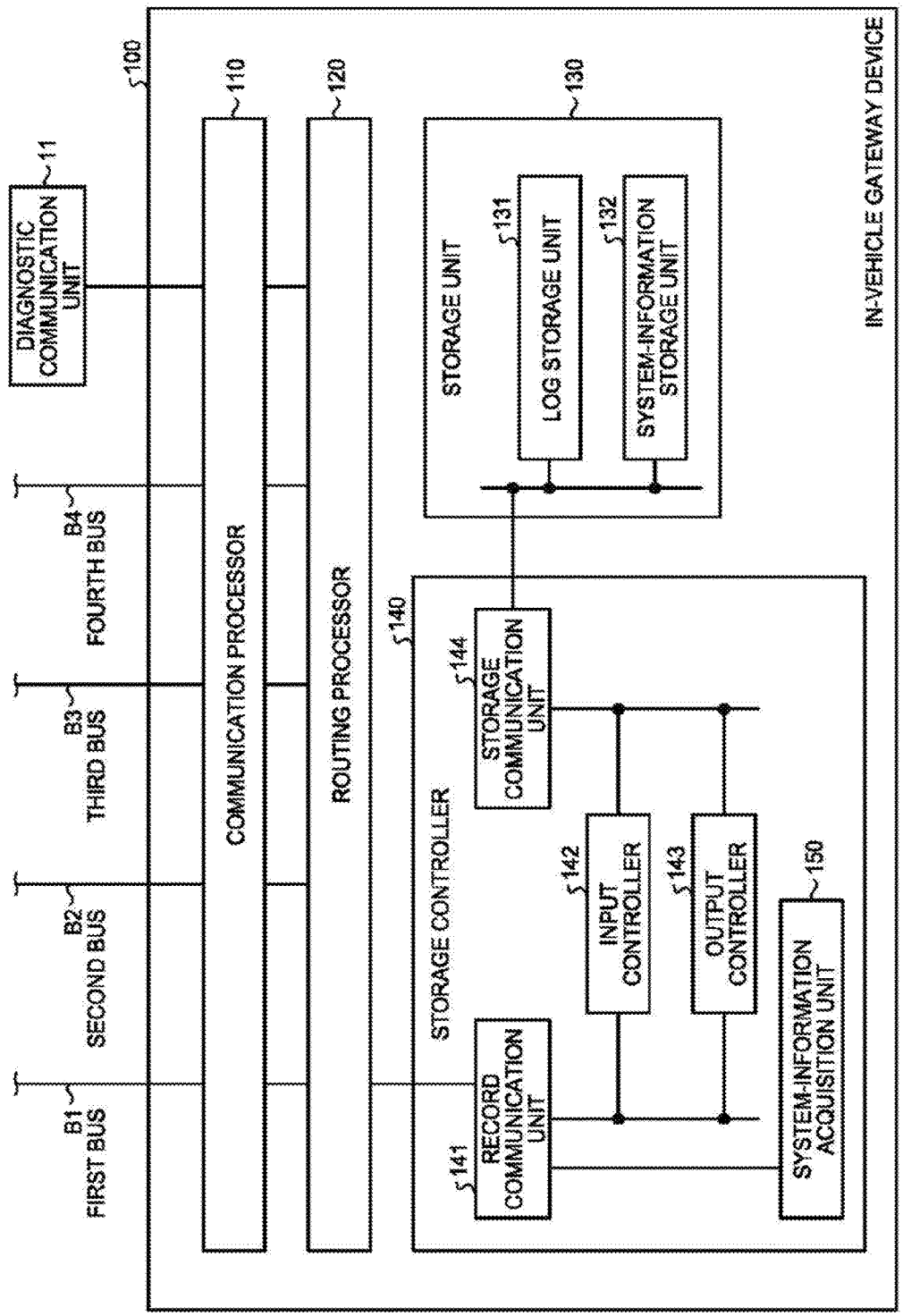
FIG. 9 is a block diagram illustrating an example of the configuration of the in-vehicle gateway device in which a system-information acquisition unit is incorporated in a storage controller.

In the configuration of the in-vehicle gateway device 100 illustrated in FIG. 8, the system-information acquisition unit 150 is connected to the routing processor 120. However, the system-information acquisition unit 150 may be configured by being incorporated in the storage controller 140. FIG. 9 illustrates an example of the configuration of such an in-vehicle gateway device 100.

In the in-vehicle gateway device 100 illustrated in FIG. 9, the system-information acquisition unit 150 is being incorporated in the storage controller 140. In the case of this configuration, the information concerning the firmware of the ECUs the system-information acquisition unit 150 acquired is transmitted to the storage unit 130 via the record communication unit 141, the input controller 142, and the storage communication unit 144, and is stored in the system-information storage unit 132.

Figure 10:
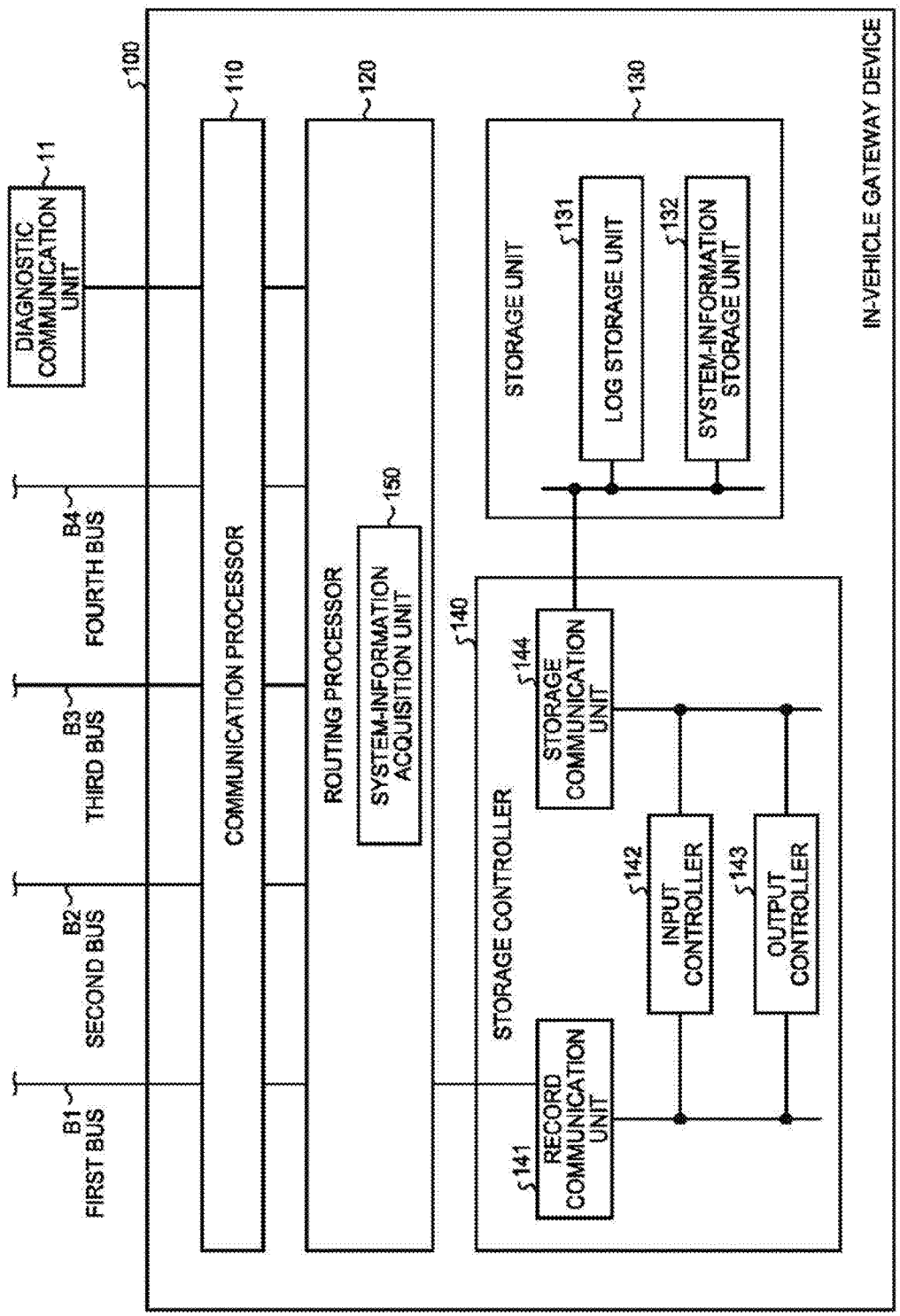
FIG. 10 is a block diagram illustrating an example of the configuration of the in-vehicle gateway device in which a system-information acquisition unit is incorporated in a routing processor.

It is also possible to configure the system-information acquisition unit 150 to be incorporated in the routing processor 120. FIG. 10 illustrates an example of the configuration of such an in-vehicle gateway device 100.

In the in-vehicle gateway device 100 illustrated in FIG. 10, the system-information acquisition unit 150 is being incorporated in the routing processor 120. In the case of this configuration, when the routing processor 120 transfers the new firmware the in-vehicle system 10 acquired to update the firmware of the ECUs, the system-information acquisition unit 150 can acquire the information concerning the firmware.

As for a trigger for the in-vehicle system 10 to acquire new firmware, examples thereof include a way that a repair person or a maintenance person transmits installation instructions to the respective ECUs by using a dedicated device, a way that the in-vehicle system 10 regularly performs communication with the outside and checks for the presence or absence of the firmware to be updated, a way that the operator of the vehicle transmits the firmware by performing communication with the in-vehicle system 10 via a wireless network by using a terminal such as a smartphone, and a way that the operator of the vehicle performs communication with the in-vehicle system 10 by using a terminal and prompts the in-vehicle system 10 to check for the presence of the latest firmware by performing communication with an update server.

While the route to acquire the new firmware is different depending on the in-vehicle system 10, examples thereof include a way via the first external communication processor 21 or the second external communication processor 23 illustrated in FIG. 1, a way via the third external communication processor 24 illustrated in FIG. 5, and a way via the diagnostic communication unit 11. In any route of acquisition, to install the firmware to each ECU, it is necessary to be carried out through the routing processor 120 of the in-vehicle gateway device 100. For example, when obtaining the firmware from the third external communication processor 24 and installing it in the engine control ECU 12, the third external communication processor 24 establishes the communication with an external device, acquires the firmware, and transfers it to the engine control ECU 12 via the routing processor 120. Then, the engine control ECU 12 installs the firmware that was received. The updating the firmware of the ECU is carried out in the foregoing procedure.

In the in-vehicle gateway device 100 of the configuration illustrated in FIG. 10, the system-information acquisition unit 150 monitors the information transferred in the routing processor 120 and, when the transferred information is the firmware of the ECUs, acquires the information concerning the firmware.

In the in-vehicle gateway device 100 of the configurations illustrated in FIGS. 8 and 9, the system-information acquisition unit 150 acquires the information concerning the firmware of the ECUs stored in the system-information storage unit 132 by actively inquiring about the information concerning the firmware to the ECUs. This is particularly useful when the firmware of the ECUs is updated without going through the routing processor 120. For example, this applies when an ECU was physically replaced or the like. That is, when the ECU breaks down, the ECU in which the latest firmware is installed may be physically replaced. At this time, because the firmware is not transferred via the routing processor 120, a way that the system-information acquisition unit 150 actively acquires the information concerning the firmware of the ECU is useful.

Also in the in-vehicle gateway device 100 of the configuration illustrated in FIG. 10, the system-information acquisition unit 150 may be configured to actively acquire the information concerning the firmware of the ECUs, in addition to monitoring the information transferred in the routing processor 120 and acquiring the information concerning the firmware of the ECUs.

Figure 11:
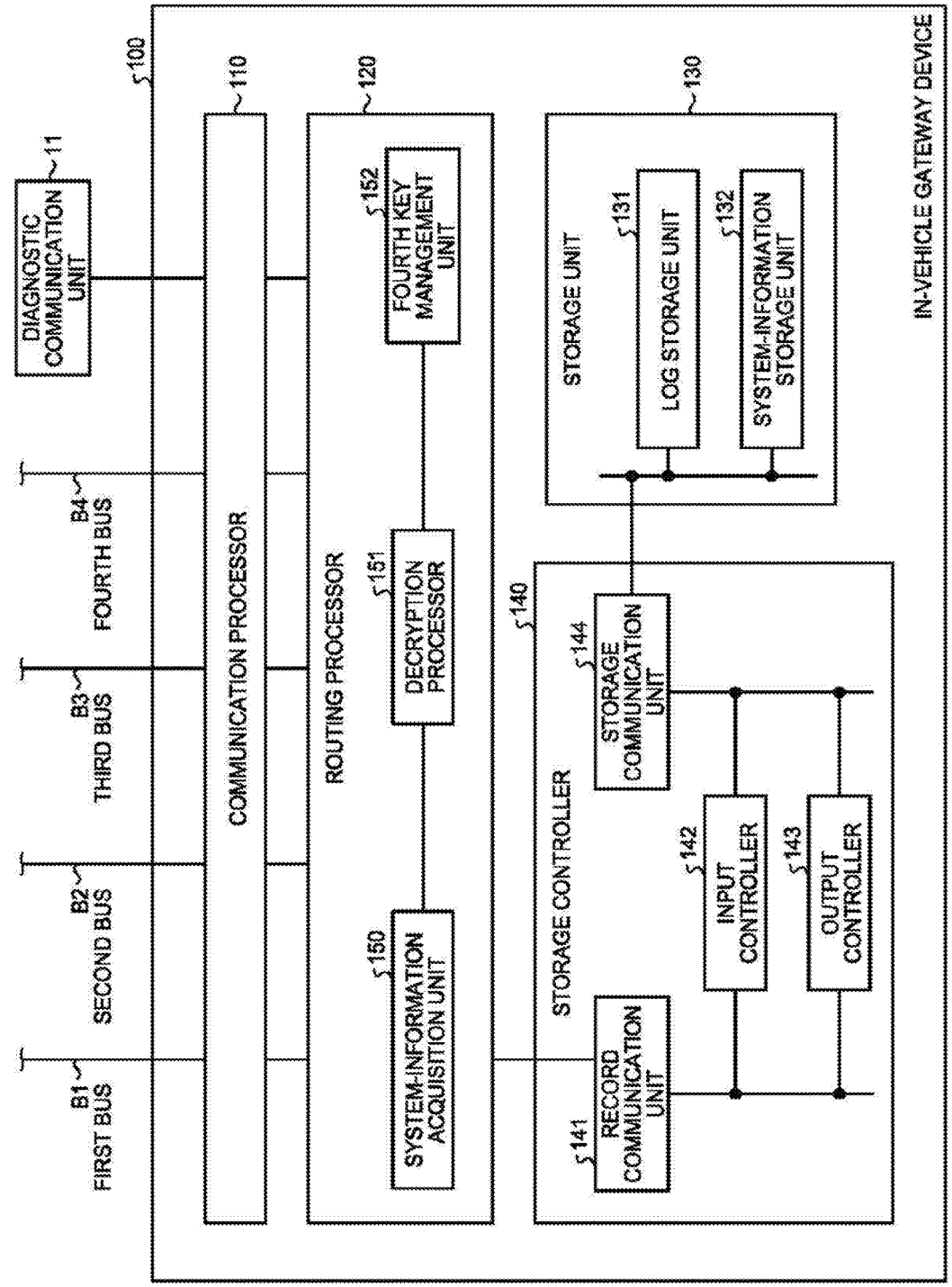
FIG. 11 is a block diagram illustrating an example of the configuration of the in-vehicle gateway device that decrypts encrypted firmware.

The firmware of the ECU may contain secret information and know-how, such as the specifications concerning the ECU and the efficient way of use of the ECU, of the vendor that provides the ECU. In order to protect the foregoing know-how and information from an attack by eavesdropping and alteration, the firmware of the ECU delivered from an external device may be encrypted. FIG. 11 illustrates an example of the configuration of the in-vehicle gateway device 100 that deals with when the firmware of the ECU is encrypted.

In the in-vehicle gateway device 100 illustrated in FIG. 11, a decryption processor 151 and a fourth key management unit 152 are incorporated inside the routing processor 120, in addition to the system-information acquisition unit 150. The decryption processor 151 performs the processing of decrypting the encrypted firmware of the ECU. The fourth key management unit 152 manages the key that the decryption processor 151 uses. The encryption algorithm may be common-key encryption such as AES, or may be public key encryption such as RSA and elliptic curve encryption.

In the case of this configuration, the encrypted firmware of the ECU acquired from the external device via any of the first external communication processor 21, the second external communication processor 23, the third external communication processor 24, and the diagnostic communication unit 11 is transferred to the ECU to be the target, after being decrypted by the decryption processor 151 in the routing processor 120. The ECU to be the target installs the firmware that is in plain text, and updates the firmware.

This example assumes that the legitimate firmware is encrypted by using a key that forms a pair with a key managed in the fourth key management unit 152 and is delivered to the in-vehicle system 10. If the firmware is altered or is encrypted with a different key, because it cannot be decrypted successfully, the firmware is not installed in the ECU to be the target.

Figure 12:
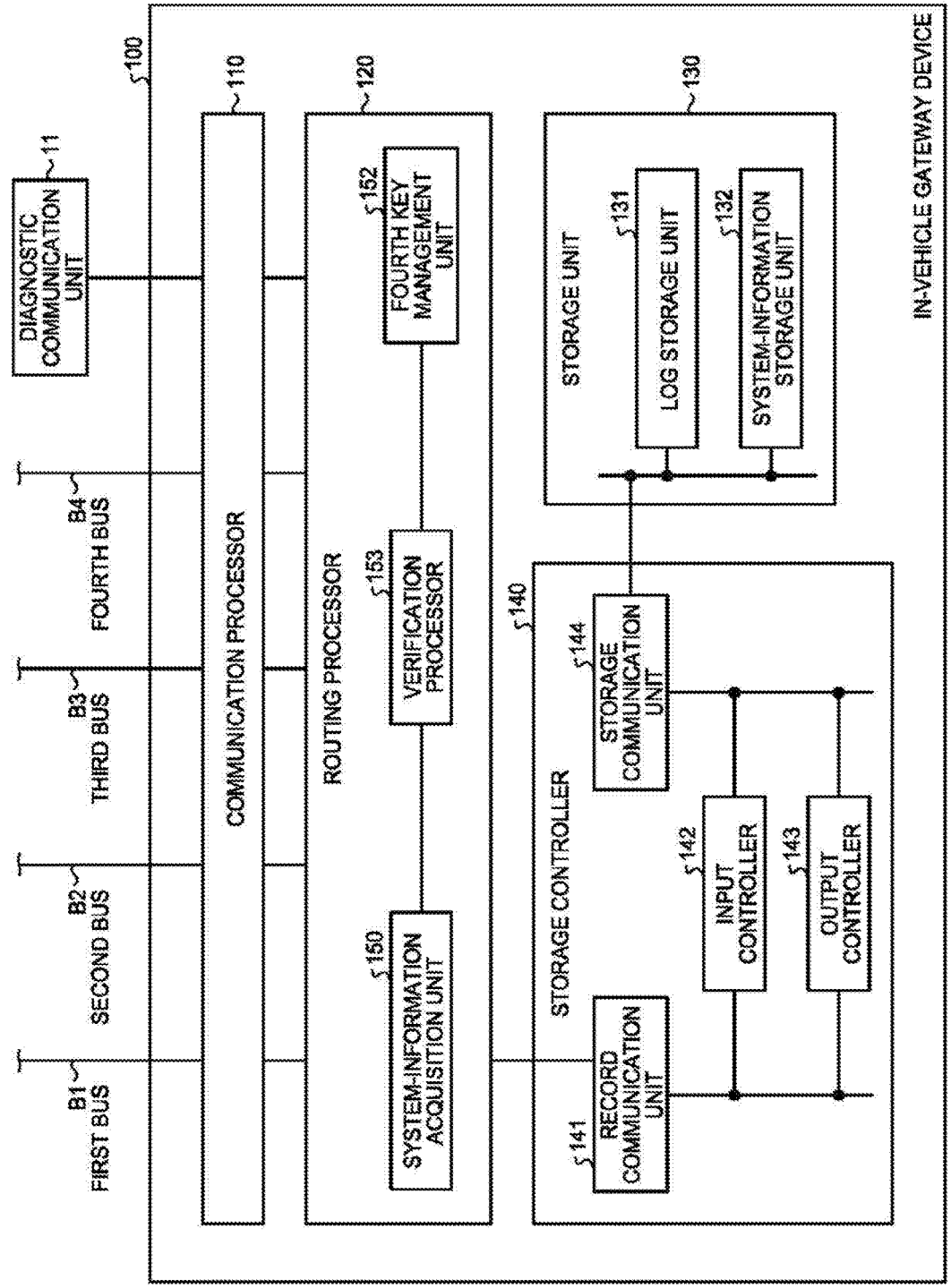
FIG. 12 is a block diagram illustrating an example of the configuration of the in-vehicle gateway device that verifies the firmware.

In the foregoing, an example that the firmware of the ECU is encrypted and delivered has been illustrated. The firmware of the ECU may be delivered being given the MAC or a signature, in place of being encrypted. By giving the MAC or the signature to the firmware of the ECU, the integrity of the data can be ensured. FIG. 12 illustrates an example of the configuration of the in-vehicle gateway device 100 that deals with such a case.

In the in-vehicle gateway device 100 illustrated in FIG. 12, a verification processor 153 is incorporated in the routing processor 120, in place of the decryption processor 151 in FIG. 11. In the case of this configuration, the routing processor 120 performs by the verification processor 153 the verification of the MAC or signature that was added to the firmware, before transferring the firmware of the ECU input from an external device to the ECU to be the target. Then, the routing processor 120 transfers, to the ECU to be the target, only the firmware for which the verification by the verification processor 153 succeeded. Accordingly, it can be checked whether the firmware of the ECU has been tampered with in the course of transmission to the in-vehicle system 10, and thus only the legitimate firmware that is not tampered with can be installed in the ECU and update it.

Figure 13:
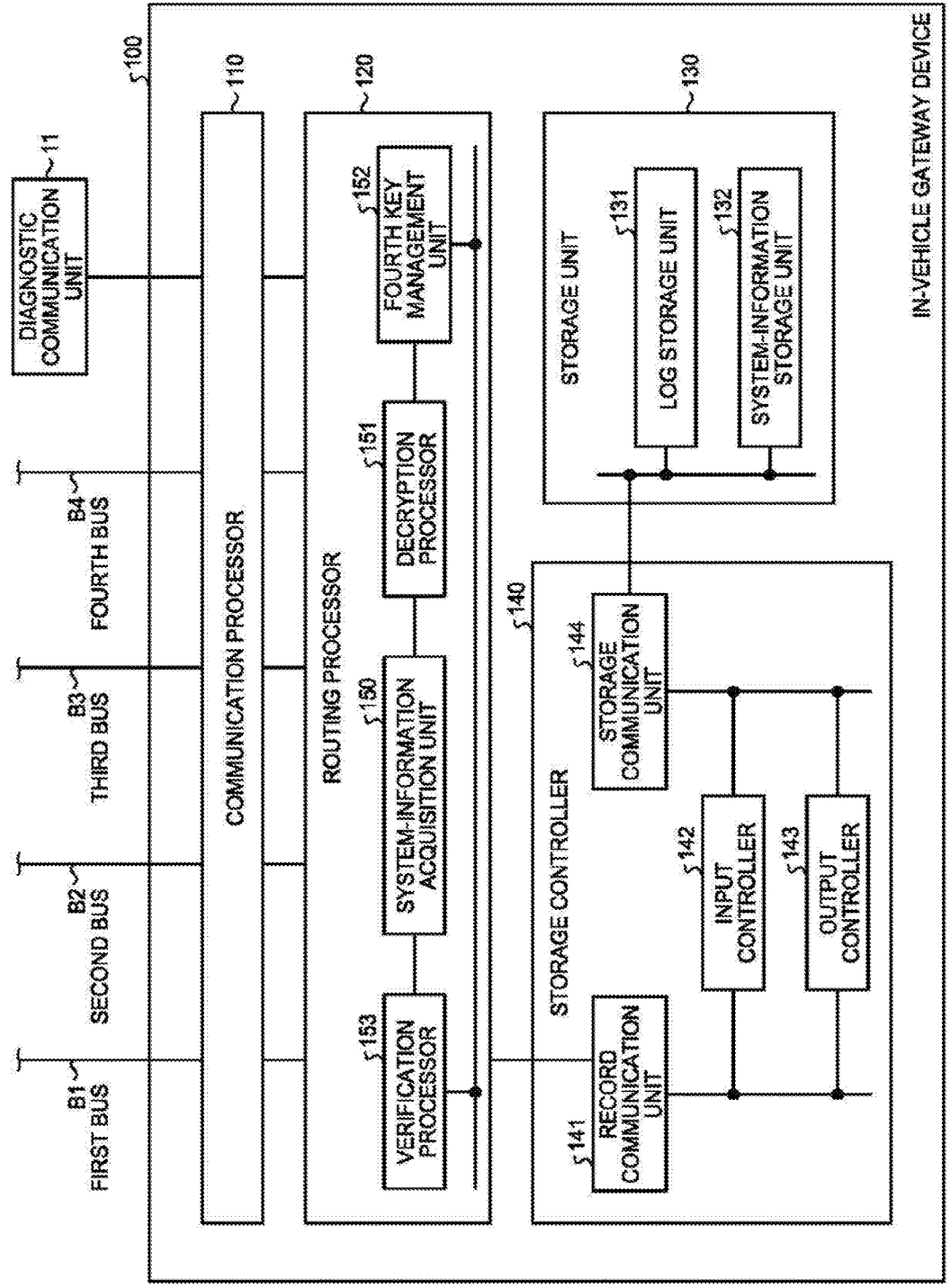
FIG. 13 is a block diagram illustrating an example of the configuration of the in-vehicle gateway device that verifies and decrypts the firmware.

The firmware of the ECU may be delivered being encrypted and being given the MAC or a signature. FIG. 13 illustrates an example of the configuration of the in-vehicle gateway device 100 that deals with such a case.

In the in-vehicle gateway device 100 illustrated in FIG. 13, the decryption processor 151 and the verification processor 153 are both incorporated in the routing processor 120. In the case of this configuration, the routing processor 120 performs by the verification processor 153 the verification of the MAC or signature that was added to the firmware, before transferring the firmware of the ECU input from an external device to the ECU to be the target. Then, the routing processor 120 decrypts only the firmware for which the verification by the verification processor 153 succeeded with the decryption processor 151, and transfers the resulting firmware to the ECU to be the target. Accordingly, it can be checked whether the firmware of the ECU has been tampered with in the course of transmission to the in-vehicle system 10 and it can prevent the eavesdropping of the firmware. Thus, only the legitimate firmware that is not tampered with can be installed in the ECU and update it while protecting the secret information contained in the firmware.

Third Embodiment

Next, the following describes a third embodiment. The third embodiment is different from the first embodiment and the second embodiment in that the data stored in the storage unit 130 is deleted. The following describes only the difference from the first embodiment and the second embodiment.

Figure 14:
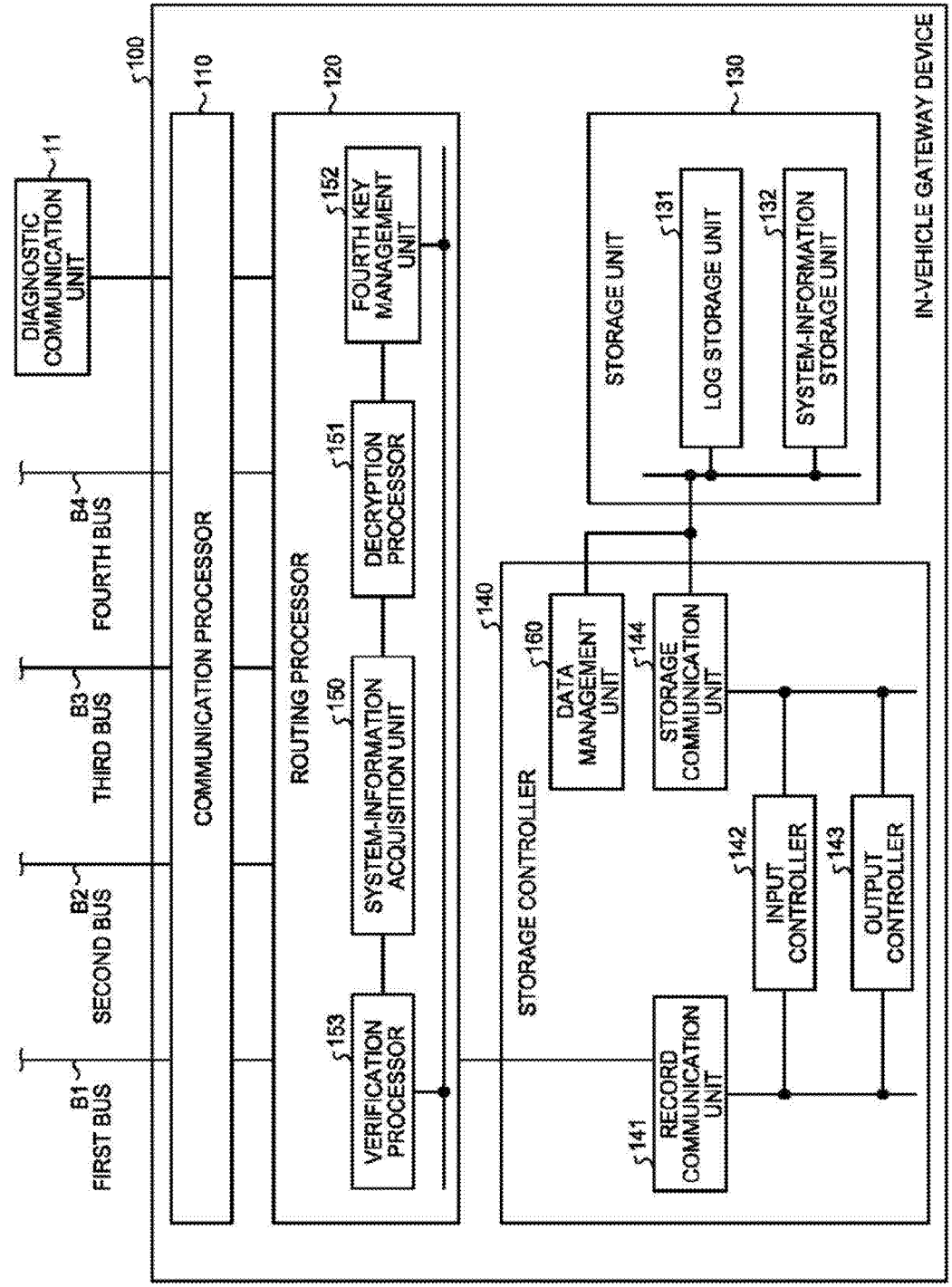
FIG. 14 is a block diagram illustrating an example of a functional configuration of an in-vehicle gateway device according to a third embodiment.

FIG. 14 is a block diagram illustrating an example of a functional configuration of the in-vehicle gateway device 100 in the third embodiment. In the in-vehicle gateway device 100 in the third embodiment, as illustrated in FIG. 14, a data management unit 160 is added. The data management unit 160 performs the processing of deleting the data the ECUs output and the information concerning the firmware of the ECUs that are stored in the storage unit 130. In FIG. 14, illustrated is an example that the data management unit 160 is incorporated in the storage controller 140. However, the data management unit 160 only needs to be configured to delete the data the ECUs output and the information concerning the firmware of the ECUs that are stored in the storage unit 130. While FIG. 14 illustrates an example of the configuration in which the data management unit 160 is added to the in-vehicle gateway device 100 of the configuration illustrated in FIG. 13, the data management unit 160 may be added to the in-vehicle gateway device 100 of any configuration disclosed in the first embodiment and the second embodiment.

As described in the foregoing, the amount of data the ECUs output becomes huge. However, because the capacity of the storage unit 130 is finite, it is not possible to keep storing all of the data. Moreover, some ECUs output data regularly. Those ECUs output various types of data such as video data and numeric data. As it is said in general that the capacity of video data is large and that of numeric data is small, the data size is different depending on the type of data. Thus, even though it is the data with the same period of time, the data size that is output differs depending on the ECU. For example, when there are an ECU that outputs numeric data and an ECU that outputs video data, and when the data these ECUs output in the identical period of time is stored in the storage unit 130, a situation that the data output by the ECU that outputs video data may occupy a large portion of the capacity of the storage unit 130 can happen.

Thus, the data management unit 160 controls the timing of deleting the data stored in the storage unit 130 depending on the type of data and performs the processing of deleting data. For example, the data management unit 160 controls the timing of deleting data depending on the type of data, such that the video data is deleted after the elapse of X time and such that the numeric data is deleted after the elapse of Y time.

In addition, a way in which, by predetermining an upper limit of the data size to be stored in the storage unit 130 depending on the type of data, the data is deleted from older data in the portion exceeding the upper limit may be employed. For example, a data size X of the upper limit for video data and a data size Y of the upper limit for numeric data are predetermined. At this time, it is assumed that the video data has reached the data size X of the upper limit while the numeric data has not reached the data size Y of the upper limit. When storing new video data into the storage unit 130, even if there is space available in the capacity for the numeric data, the old video data is deleted and, in place of that, the new video data is stored.

While an example of controlling the timing of deleting the data stored in the storage unit 130 depending on the type of data has been described in the foregoing, the timing of deleting the data may be controlled depending on which ECU the data stored in the storage unit 130 was output from. That is, the timing of deleting data may be controlled for each ECU, such that the data one ECU outputs is deleted after the elapse of X time and such that the data another ECU outputs is deleted after the elapse of Y time.

The deletion of respective data stored in the log storage unit 131 and in the system-information storage unit 132 may be controlled separately. The data stored in the log storage unit 131 is the data the ECUs output and, in particular, new data is input one after another while the in-vehicle system 10 is running, and is used for checking the occurrence of a failure and the reception of an attack. Meanwhile, the data stored in the system-information storage unit 132 is the information concerning the firmware of the ECUs and the frequency of updating the firmware of the ECUs is not high. Thus, the data management unit 160 may separately manage the timing of deleting these data.

In the foregoing, a situation that the size of the data stored in the storage unit 130 exceeded the capacity has been assumed. However, it may be configured to delete the data that was output to an external device from the storage unit 130. The in-vehicle system 10 can be connected to the external device via the first external communication processor 21, the second external communication processor 23, the third external communication processor 24, or the diagnostic communication unit 11. Consequently, by transmitting the data in the storage unit 130 to the external device via a network, it can be avoided that the capacity of the storage unit 130 becomes full. The external device may be such device as a PC, a smartphone, and a USB memory, and may be a server system such as a cloud server.

The data management unit 160, when the data stored in the storage unit 130 was transmitted to an external device via the routing processor 120, performs the processing of deleting the data that has been transmitted from the storage unit 130. It is desirable that the data management unit 160 delete the data stored in the log storage unit 131 while not deleting the information concerning the firmware of the ECUs that is stored in the system-information storage unit 132 even though it has been transmitted to the external device. This is because the information concerning the firmware of the ECUs is desired to be kept managed in the in-vehicle system 10.

Furthermore, it is conceivable that the owner of the vehicle on which the in-vehicle system 10 is equipped changes. In such a case, a measure that has taken privacy into consideration is desired. That is, the data stored in the storage unit 130 that the ECUs output may contain information concerning a variety of privacy. For example, when the positional information on the vehicle (GPS information) and the time information on driving the vehicle are stored, it can tell when and where the owner thereof was. In addition, in the log storage unit 131, the data stored in the log storage unit 131 may contain the information such as which route the vehicle has been driven, what kind of route search was done in the video processing ECU 20, what kind of restaurants were searched in the video processing ECU 20, what kind of video content was viewed in the video processing ECU 20, and how the seat adjustment was made. Accordingly, when the owner of the vehicle on which the in-vehicle system 10 is equipped is changed, it is desirable that the information concerning the privacy of a previous owner can be deleted completely.

Figure 15:
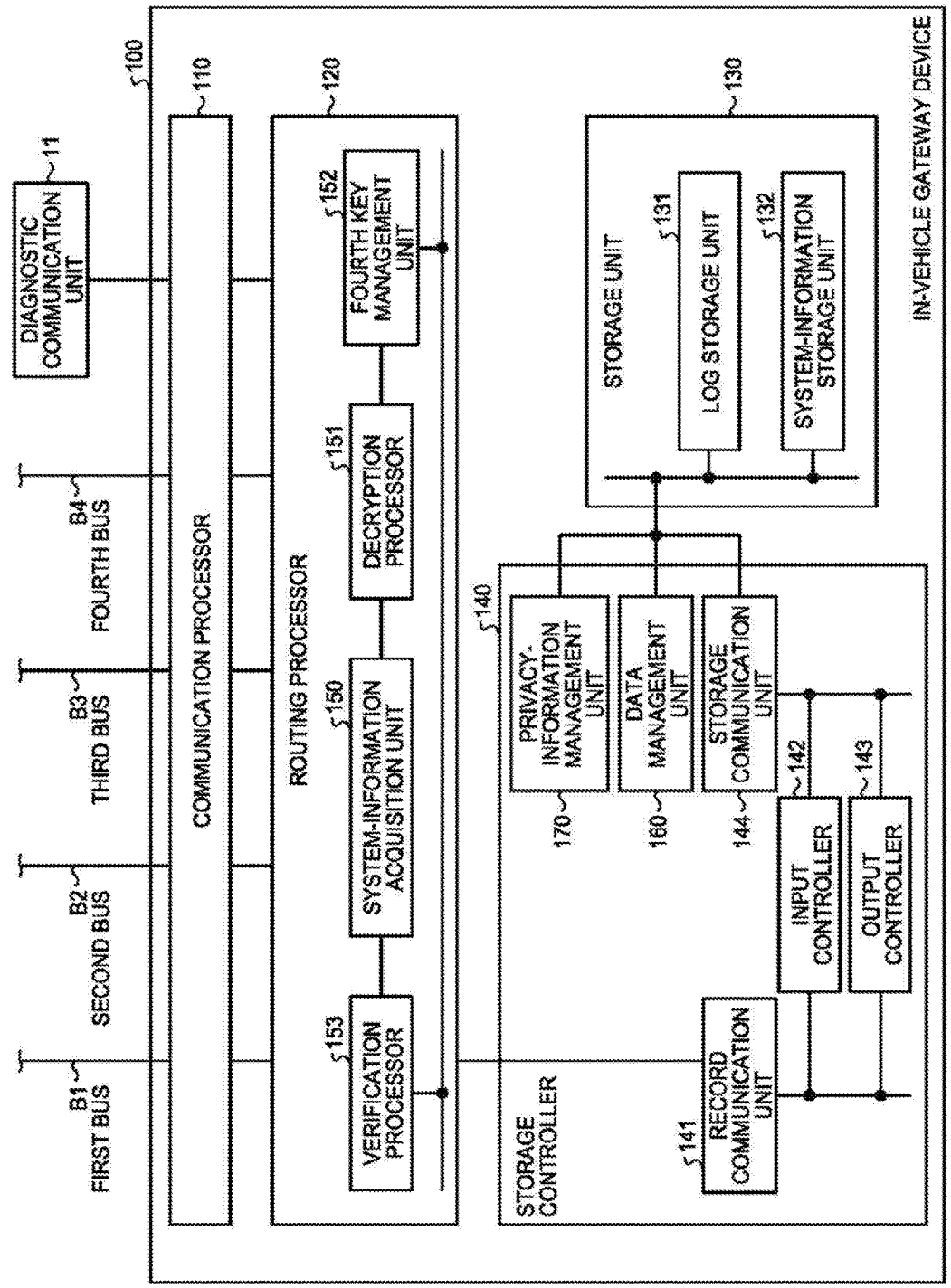
FIG. 15 is a block diagram illustrating an example of the configuration of the in-vehicle gateway device that has taken privacy into consideration.

FIG. 15 is a block diagram illustrating an example of the configuration of the in-vehicle gateway device 100 that has taken privacy into consideration. In the in-vehicle gateway device 100 illustrated in FIG. 15, a privacy-information management unit 170 is added to the configuration illustrated in FIG. 14.

The privacy-information management unit 170 instructs the log storage unit 131 to delete the information concerning privacy stored in the log storage unit 131. Of the data stored in the log storage unit 131 the ECUs output, which data corresponds to the data concerning privacy may be defined in the privacy-information management unit 170 in advance, or the relevant data may be selected from the ECUs or may be instructed from an external device via the routing processor 120.

Figure 16:
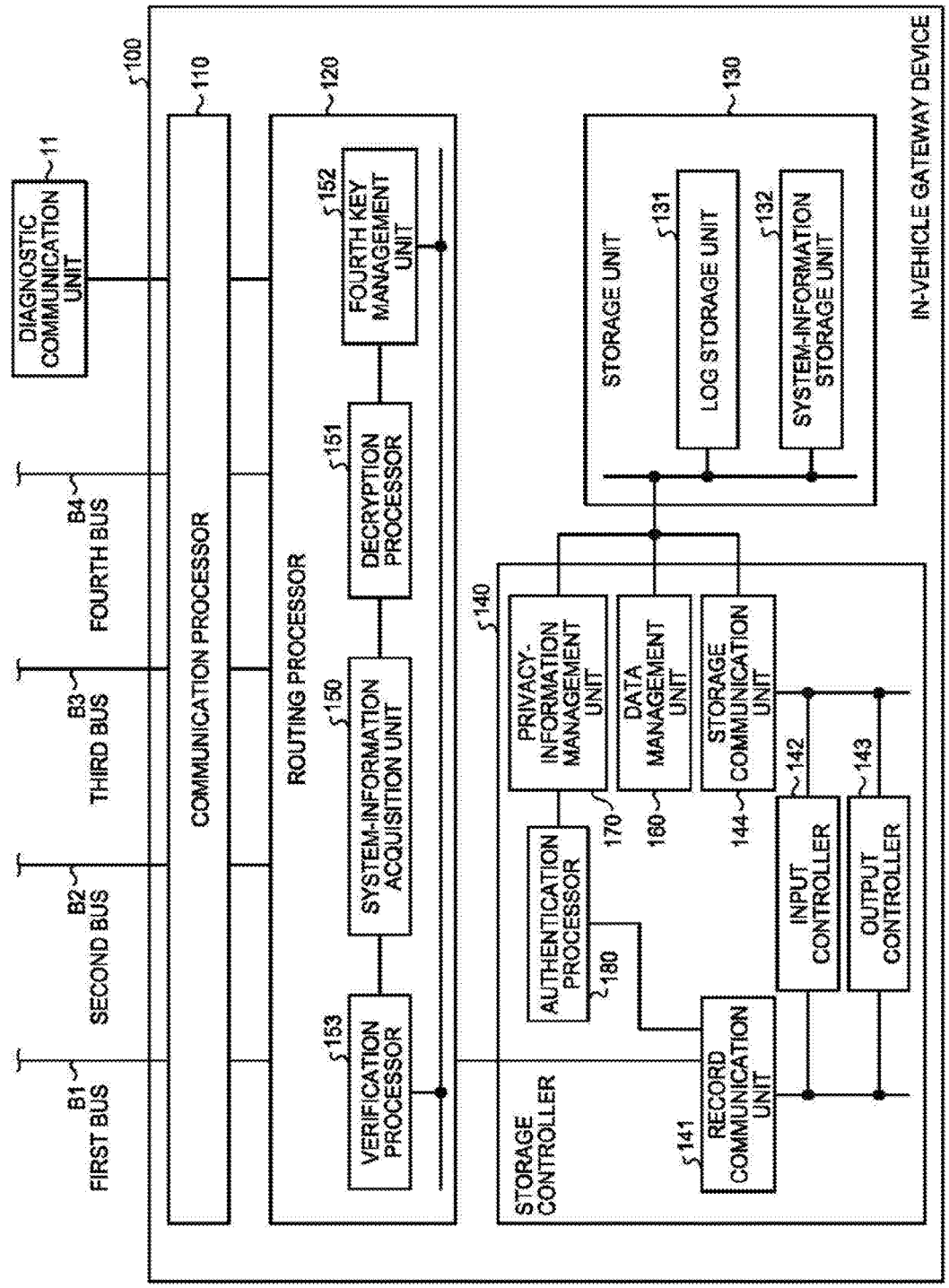
FIG. 16 is a block diagram illustrating an example of the configuration of the in-vehicle gateway device that deletes privacy information when authentication succeeded.

In order to prevent the privacy information from being illicitly deleted, it may be configured such that the authentication processing is performed with an external device via the first external communication processor 21, the second external communication processor 23, the third external communication processor 24, or the diagnostic communication unit 11 and such that the deletion of the privacy information is permitted only when the authentication succeeded. FIG. 16 illustrates an example of the configuration of such an in-vehicle gateway device 100.

In the in-vehicle gateway device 100 illustrated in FIG. 16, an authentication processor 180 is added to the configuration illustrated in FIG. 15. The authentication processor 180 performs authentication processing for the ECUs or an external device. As for the authentication method, public key authentication that uses public key algorithm such as RSA or password authentication only needs to be used. The authentication processor 180, when the authentication succeeded, notifies the privacy-information management unit 170 that the authentication succeeded. The privacy-information management unit 170 instructs the log storage unit 131 to delete the privacy information, only when the notification of successful authentication was received from the authentication processor 180.

Moreover, it is conceivable that the operator buys a replacement vehicle of another type or changes to another vehicle of the same type due to a failure. In such a case, it is desired that the privacy information stored in the log storage unit 131 can be transferred to the in-vehicle system 10 of the other vehicle. That is, the driving-support control ECU 22 inputs the information on the habit in the operation of the operator, and performs control such that a comfortable drive can be performed by learning algorithm. When the operator changes vehicles, the information on the habit is reset and, if the learning is newly started, a comfortable drive cannot be achieved in the beginning of changing vehicles. Thus, it is desired that the privacy information stored in the log storage unit 131 be transferred to a new vehicle.

In such a case, the privacy-information management unit 170 acquires the privacy information from the log storage unit 131 and transmits it to an external device and the like. Meanwhile, the in-vehicle system 10 that is equipped in another vehicle inputs the privacy information on the operator from the external device and stores it in the log storage unit 131. At this time, in order to prevent the leakage of the privacy information, prior to the transmission of the privacy information, the authentication processing by the authentication processor 180 may be performed. Furthermore, after the transmission of the privacy information, the transmitted information may be deleted from the log storage unit 131.

As described in the foregoing, the in-vehicle gateway device 100 in the third embodiment can effectively prevent the data of the storage unit 130 from overflowing, by including the function of deleting the data stored in the storage unit 130. Furthermore, by including the function of performing the deletion and transfer of the privacy information, appropriate measures can be taken while the privacy is taken into consideration even when the owner of the vehicle is changed or vehicles are changed.

Modification

When a data deletion method of high reliability is applied to a large-scale data, it may take a long time or may lead to the exhaustion of media. Thus, in the present modification, it is configured such that the data stored in the log storage unit 131 is encrypted by using a common key for each group of certain units, and such that the encryption key that was used in the encryption processing is deleted (or overwritten with a new key). This makes fast and highly reliable data invalidation possible. The data invalidation means turning the data into a state incapable of decryption and has the same effect as the above-described deletion of data. The certain unit may be a unit of data of a certain size, and an encryption key may be prepared by grouping for each type of data, for each purpose of data, or for each area of the storage unit 130. In such a manner, the frequency of updating the key itself can be reduced.

The input controller 142 in the modification includes at least the first encryption processor 202 and the key management unit 203. The key management unit 203 then, in response to a delete request from the data management unit 160, updates or deletes the key used for the encryption processing of the relevant data. The encryption key in units different from the encryption processing for ensuring the authenticity and integrity may be used. In such a manner, a situation in which the unit of being deleted and the unit of asserting the legitimacy of log are different can also be handled.

The key management unit 203 may include a random number generator to implement fast generating of encryption keys, and may include the function of generating numerous encryption keys beforehand and keeping them stored.

By assuming such a configuration, deleting only a small amount of data referred to as key data can invalidate the data that was encrypted by the key data. It is useful when the data is stored in a storage medium that takes time for erasing data. Furthermore, even when the data are recorded in physically separated recording places of the storage unit 130, the data can be invalidated at one time. This property is particularly useful, in a recording medium such as a flash memory that needs data erase operation for each block, when invalidating the data that is dispersed in a plurality of blocks, for example. While the data stored in the log storage unit 131 is written in time series, the data desired to be erased do not necessarily arise in time series. In this case, the dispersion of managed data into a plurality of blocks can arise. However, even in such a case, the invalidating of the data can be performed efficiently.

Figure 17:
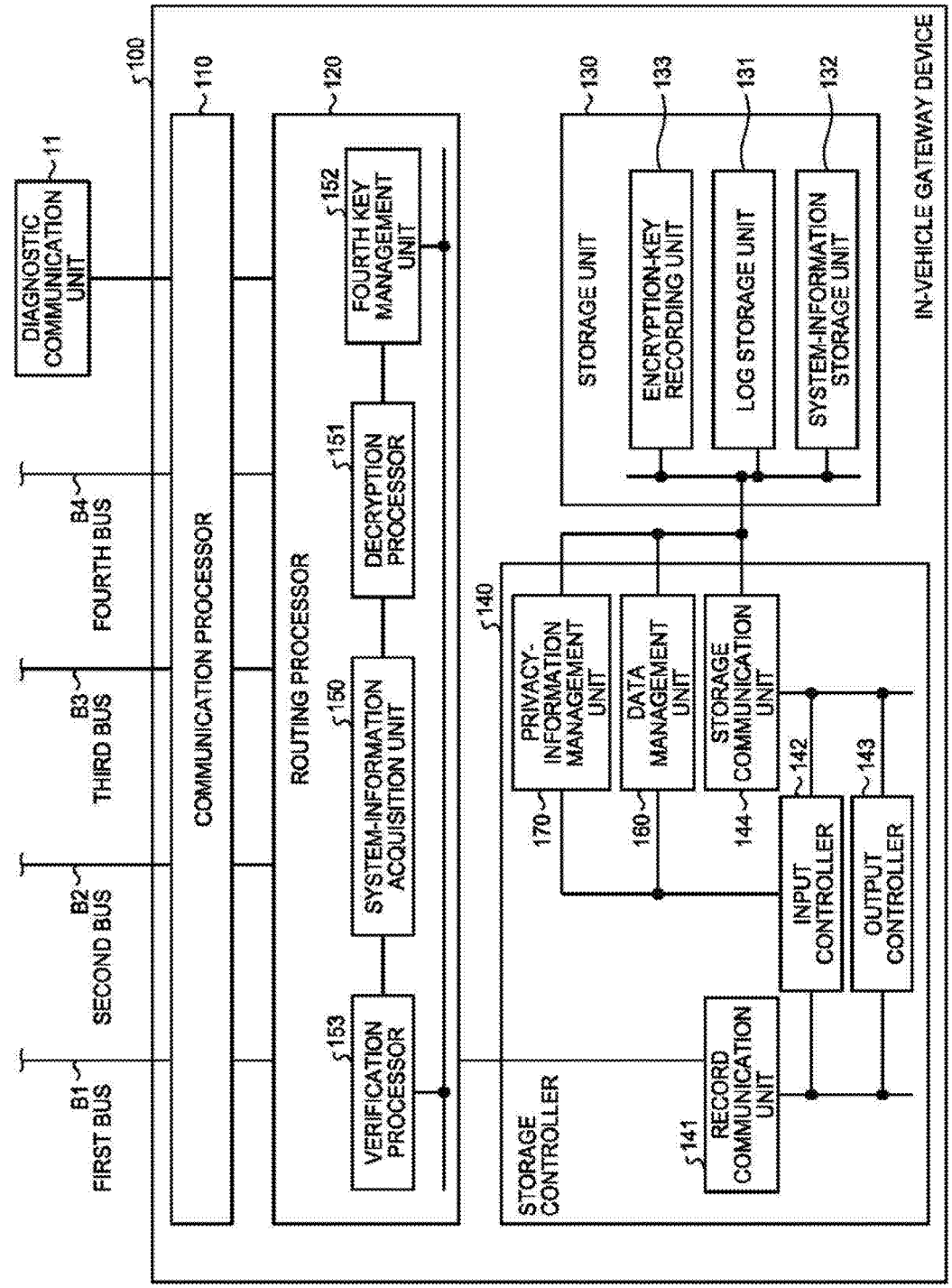
FIG. 17 is a block diagram illustrating an example of the configuration of the in-vehicle gateway device that includes an encryption-key recording unit.

In addition to the encryption key (for the convenience, it is referred to as data-encryption key) for encrypting the data stored in the log storage unit 131, an encryption key to encrypt and decrypt the data-encryption key (for the convenience, it is referred to as key-encryption key) is considered. FIG. 17 illustrates such a configuration. The configuration example illustrated in FIG. 17 is different from that of FIG. 16 in that an encryption-key recording unit 133 is newly included in the storage unit 130.

In the foregoing configurations, the data-encryption key is managed by the key management unit 203. However, in the configuration illustrated in FIG. 17, the key-encryption key is managed by the key management unit 203. The encrypted data-encryption key is managed by the encryption-key recording unit 133 of the storage unit 130. In the key management unit 203, the encrypted data-encryption key that is stored in the encryption-key recording unit 133 is supplied to the first encryption processor 202 and the third encryption processor 306 after decryption with the key-encryption key, the data-encryption key to be stored is stored in the encryption-key recording unit 133 after being encrypted with the key-encryption key, and the data encryption-key is deleted in response to the request from the data management unit 160.

A plurality of data-encryption keys is prepared, and the data are grouped for each type of data, for each purpose of data, or for each area of the storage unit and the respective groups are encrypted with different data-encryption keys. The data-encryption keys are encrypted and decrypted with an identical key-encryption key. Accordingly, erasing a single key-encryption key can invalidate in a lump the data encrypted by using a plurality of encryption keys that was encrypted with the key-encryption key. Furthermore, by storing the key-encryption key that is a small amount of data into a place such as inside of an LSI chip (such as an on-chip flash memory) in which it is relatively robust against a physical attack (low-speed bus probing, data tampering, and removal and replacement of or illicit use of the chip), the security can be ensured even when the encrypted data-encryption key is stored in a recording medium that is relatively weak against the physical attack.

Figure 18:
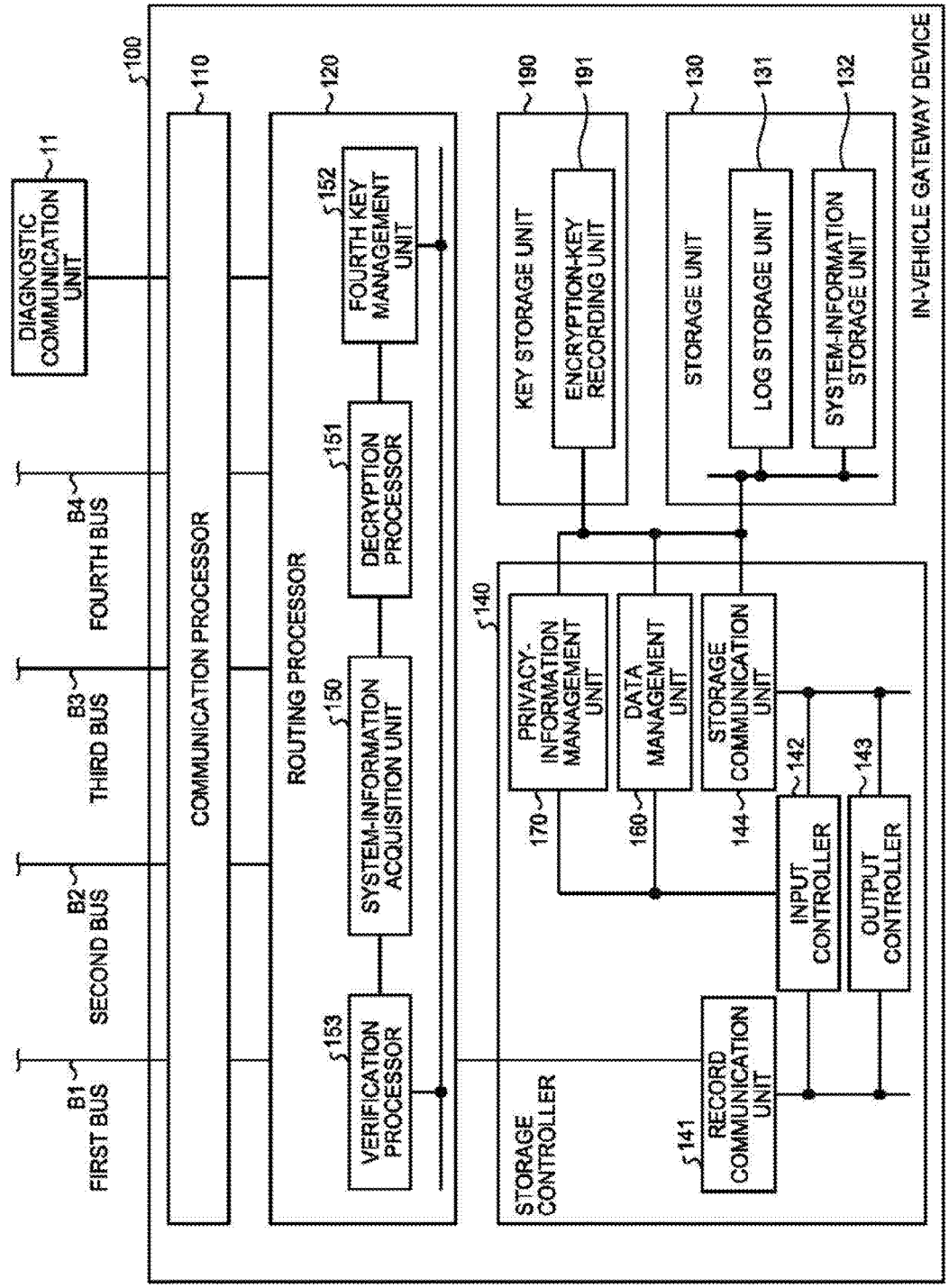
FIG. 18 is a block diagram illustrating an example of the configuration of the in-vehicle gateway device in which the encryption-key recording unit is provided in a key storage unit.

While the encryption-key recording unit 133 is provided in the storage unit 130 in FIG. 17, the encrypted data-encryption key may be stored in an area separate from the storage unit 130. FIG. 18 illustrates such a configuration. The configuration example illustrated in FIG. 18 is different from that of FIG. 17 in that a key storage unit 190 is newly included and in that an encryption-key recording unit 191 is provided in the key storage unit 190.

In the configuration example illustrated in FIG. 18, the encrypted data-encryption key is recorded into the key storage unit 190 that is a storage medium different from the storage unit 130 that includes the log storage unit 131 and the system-information storage unit 132. In addition to that, by taking the characteristics of the respective storage media into consideration, the appropriate use of the storage media for the encryption keys and data can achieve the optimal and highly reliable in-vehicle gateway device 100. As one example, the encryption key that is critical but is of a small amount is recorded into a recording medium that is of high bit cost and of characteristics excellent in the rewritable number of times and others, and the log data that is of a large capacity is recorded into a less expensive recording medium.

The consideration for the above-described deletion method particularly has a great effect in implementing an in-vehicle information recording unit in particular that requires reliability and real-time property.

Fourth Embodiment

Because the amount of data that the in-vehicle gateway device 100 in the in-vehicle system 10 should process is large, as in the first embodiment, it is necessary to filter the data to store in the storage unit 130 by the filtering processor 121 in the routing processor 120 and by the input controller 142 in the storage controller 140. Furthermore, by making this processing not fixed but variable depending on the amount of data, the availability of a log mechanism can also be ensured. A fourth embodiment is an example of the configuration to prevent an attack that made misuse of such variation in the processing.

An attacker may attempt to expand the range that the attacker can attack to achieve the purpose. Supposed here is a situation in which an attacker who illicitly accessed the in-vehicle gateway device 100 attempts to expand the range that the attacker himself/herself can illicitly access. The attacker inputs data that is not actually received to the routing processor 120 and the storage controller 140 directly such that the policy of filtering data by the filtering processor 121 and the rule of filtering data by the input controller 142 are altered depending on the amount of data. Accordingly, the in-vehicle gateway device 100 performs the new operation so as to filter, based on the fictitious data input by the attacker, the data that the filtering processor 121 and the input controller 142 store into the storage unit 130. The attacker performs an illicit access so that the data is not stored in the storage unit 130 in the new operation. As just described, there is an attack that makes misuse of the mechanism for the availability of the log mechanism. The fourth embodiment is in consideration of measures against such an attack.

Figure 19:
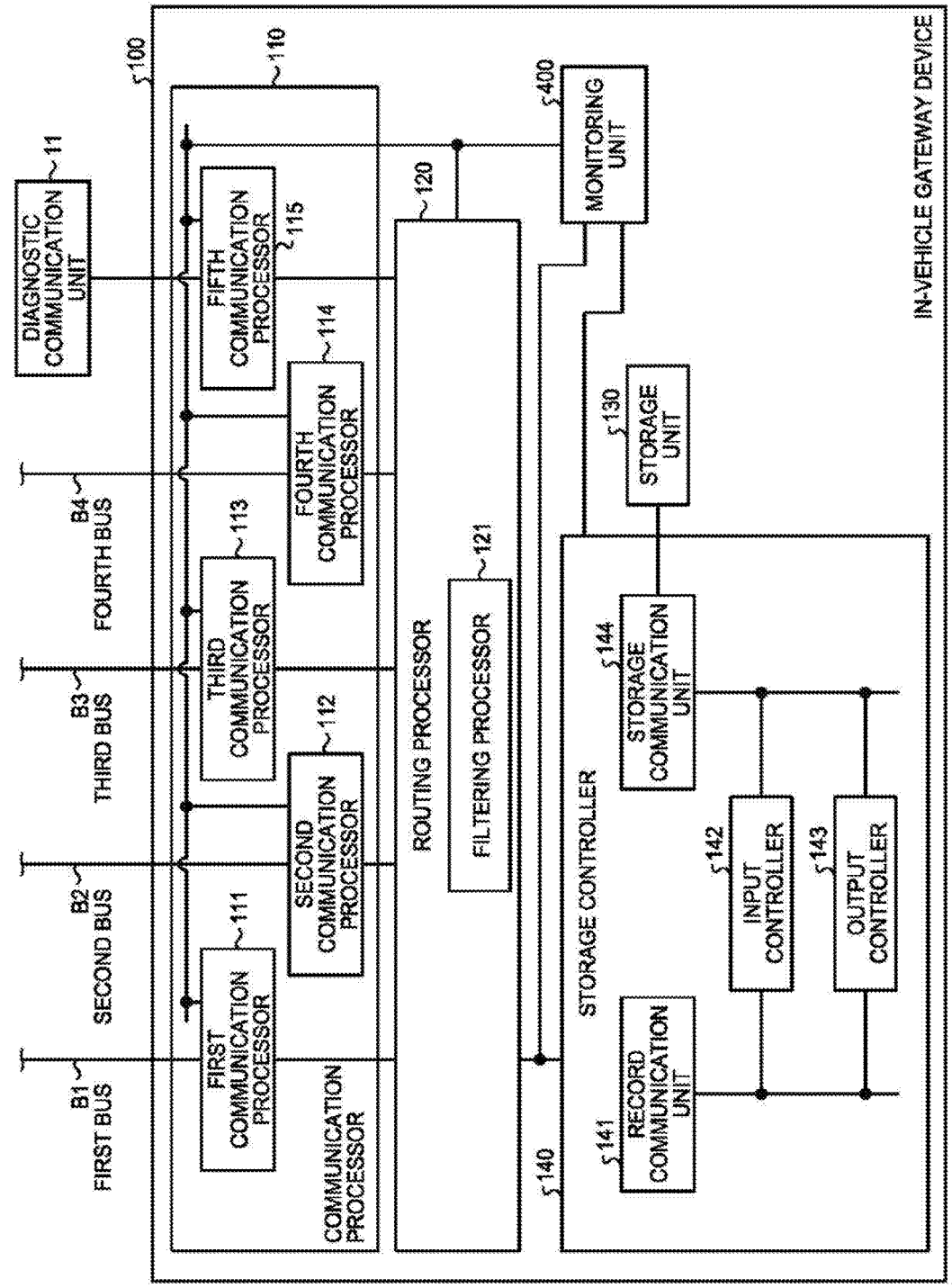
FIG. 19 is a block diagram illustrating an example of a functional configuration of an in-vehicle gateway device according to a fourth embodiment.

FIG. 19 is a block diagram illustrating an example of a functional configuration of the in-vehicle gateway device 100 in the fourth embodiment. As compared with the configuration in the first embodiment illustrated in FIG. 2, it is different in that a monitoring unit 400 is added. The monitoring unit 400 is connected to the individual units of the in-vehicle gateway device 100 and is implemented with a CPU core and a memory, or a hardware mechanism, independent of the communication processor 110, the routing processor 120, the storage unit 130, and the storage controller 140.

In the in-vehicle gateway device 100 in the fourth embodiment, the monitoring unit 400 monitors the respective buses and, before changing the policy of the filtering processor 121 or the rule of the input controller 142, checks if an event to be a cause of the policy change or the rule change has actually occurred, for example. For example, when a policy change is requested while monitoring the capacity of the storage unit 130, the monitoring unit 400 independently checks the capacity of the storage unit 130, thereby confirming that the routing processor 120 is not being illicitly accessed. For example, when the change of rule is requested such that the type of data and the amount of data that the input controller 142 transmits to the storage unit 130 are reduced because the amount of data input from the routing processor 120 is large, the monitoring unit 400 checks the amount of data of the input and output of the communication processor 110, thereby confirming that the storage controller 140 is not being illicitly accessed. Furthermore, the monitoring unit 400 checks the capacity of the storage unit 130, and thus an attack that erases data by faking information on an event that triggers the erasure of data and transmitting it to the storage controller 140 can also be handled.

As described in the foregoing, in the in-vehicle gateway device 100 in the fourth embodiment, when a change of policy or rule for filtering the data to store into the storage unit 130 is requested, the monitoring unit 400 checks if an event to be a cause of the policy change or the rule change has actually occurred. Thus, an attempt to erase the trace of an attack by the attacker who illicitly accessed the in-vehicle gateway device 100 can be prevented.

Additional Description

The functional constituent elements of the in-vehicle gateway device 100 in the above-described embodiments can be implemented by the collaboration of hardware and software (computer programs), for example. As for the hardware, there are ones that make the in-vehicle gateway device 100 operate as a computer system, such as a hardware processor of various types, a volatile or non-volatile memory, a memory controller, and a communication module. By executing a certain computer program on such a computer system, the above-described functional constituent elements of the in-vehicle gateway device 100 can be implemented.

The computer program that implements the functional constituent elements of the in-vehicle gateway device 100 is provided by being embedded in advance in a non-volatile memory, for example. Furthermore, the above-described computer program may be provided in a file of an installable format or of an executable format recorded on a computer readable recording medium. The above-described computer program may be stored in a computer connected to a network such as the Internet and be provided by being downloaded via the network. The above-described computer program may be provided or distributed via a network such as the Internet. It is also possible to implement the whole or a part of the above-described functional constituent elements in the in-vehicle gateway device 100 by using dedicated hardware such as an ASIC and an FPGA.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An in-vehicle gateway device equipped in an in-vehicle system, the in-vehicle gateway device comprising:
a memory configured to function as a storage; and
one or more processors configured to function as internal communication processors, a routing processor, and a storage controller, wherein
the storage stores therein data output by electronic controllers included in the in-vehicle system,
the internal communication processors include an internal communication processor to which at least one electronic controller is connected,
the routing processor transfers data among the internal communication processors and outputs at least a part of the transferred data to the storage in a form capable of being stored in the storage,
the storage controller, in accordance with a certain rule, manipulates or filters at least one of data to store in the storage and data output from the storage, and
a key used in manipulating the data by the storage controller differs depending on an output destination of data.

2. The in-vehicle gateway device according to claim 1, wherein at least one of the internal communication processors performs communication with an external communication processor that is outside of the in-vehicle gateway device and connected to the Internet.

3. The in-vehicle gateway device according to claim 1, wherein the manipulation of the at least one data by the storage controller includes encryption processing using the key.

4. The in-vehicle gateway device according to claim 3, wherein the one or more processors are configured to further function as diagnostic communication circuitry,
the diagnostic communication circuitry transmits data the electronic controller outputs to an external device, and the storage controller encrypts the data output from the storage when an output destination of the data output from the storage is the external device.

5. The in-vehicle gateway device according to claim 1, wherein the storage controller comprises mode-setting circuitry that sets a setting of whether to perform manipulation or filtering of data, or that sets a setting of changing the rule when performing the manipulation or filtering of data.

6. The in-vehicle gateway device according to claim 1, wherein the certain rule includes a rule of permitting or prohibiting input of data to the storage depending on a bus on which the data output by the controller is transmitted.

7. The in-vehicle gateway device according to claim 1, wherein the certain rule includes a rule of determining, depending on whether pieces of data output to different buses by the electronic controllers that acquire an identical sensor signal match up, the in-vehicle gateway device stores the pieces of data into the storage if the pieces of data do not match up, and the in-vehicle gateway device stores only one piece of data output by any of the electronic controllers outputs into the storage if the pieces of data match up.

8. The in-vehicle gateway device according to claim 1, wherein the one or more processors are configured to further function as information acquisition circuitry,
the information acquisition circuitry acquires information concerning firmware of the electronic controller, and
the storage stores therein the data output by the electronic controller outputs and the information concerning the firmware that the information acquisition circuitry acquires.

9. The in-vehicle gateway device according to claim 8, wherein the information acquisition circuitry monitors updating of the firmware via the in-vehicle system and acquires the information concerning the firmware.

10. The in-vehicle gateway device according to claim 8, wherein the information acquisition circuitry acquires the information concerning the firmware by inquiring about the information concerning the firmware to the electronic controller.

11. The in-vehicle gateway device according to claim 8, wherein
the firmware is encrypted,
the routing processor decrypts the encrypted firmware that is transmitted from an external device, and transfers the decrypted firmware to the internal communication processor to which the electronic controller is connected, and
the information acquisition circuitry acquires the information concerning the firmware when the decrypted firmware is transferred to the internal communication processor to which the electronic controller is connected.

12. The in-vehicle gateway device according to claim 8, wherein the information concerning the firmware is information on version of the firmware or is a hash value of the firmware.

13. The in-vehicle gateway device according to claim 1, wherein the one or more processors are configured to further function as a data management circuitry,
the data management circuitry t deletes or invalidates the data that the storage stores.

14. The in-vehicle gateway device according to claim 13, wherein the data management circuitry determines, depending on types of the data that the storage stores, timing of deleting or invalidating the data.

15. The in-vehicle gateway device according to claim 13, wherein the data management circuitry deletes or invalidates the data that the storage stores when the data is output to an external device.

16. The in-vehicle gateway device according to claim 13, wherein the data management circuitry deletes or invalidates the data that the storage stores when the in-vehicle gateway device detects that operators of a vehicle in which the in-vehicle system is equipped are changed.

17. The in-vehicle gateway device according to claim 1, wherein the one or more processors are configured to further function as monitoring circuitry,
the monitoring circuitry checks, when a change of the rule for filtering data to store into the storage is requested, whether an event to be a cause of the change actually occurs.

18. A storage control method executed in an in-vehicle gateway device equipped in an in-vehicle system, the in-vehicle gateway device including a memory configured to function as a storage that stores therein data output by electronic controllers included in the in-vehicle system, and one or more processors configured to function as internal communication processors, a routing processor, and a storage controller, the storage control method comprising:
transferring data, by the routing processors, data among internal communication processors including an internal communication processor to which at least one electronic controller is connected, and outputting at least a part of the transferred data to the storage in a form capable of being stored in the storage; and
manipulating or filtering, by the storage controller, in accordance with a certain rule, at least one of data to store in the storage and data output from the storage, wherein
a key used in manipulating the data differs depending on an output destination of data.

19. A computer program product having a non-transitory computer readable medium including programmed instructions, wherein the instructions cause an in-vehicle gateway device equipped in an in-vehicle system to perform:
a function of a storage that stores therein data output by electronic controllers included in the in-vehicle system;
a function of internal communication processors that include an internal communication processor to which at least one electronic controller is connected;
a function of a routing processor that transfers data among the internal communication processors and outputs at least a part of the transferred data to the storage in a form capable of being stored in the storage; and
a function of a storage controller that, in accordance with a certain rule, manipulates or filters at least one of data to store in the storage and data output from the storage, wherein
a key used in manipulating the data by the storage controller differs depending on an output destination of data.

* * * * *